(12) United States Patent
Bull

(10) Patent No.: US 10,795,719 B2
(45) Date of Patent: Oct. 6, 2020

(54) DYNAMIC STATE-DRIVEN CENTRALIZED PROCESSING

(71) Applicant: Alegeus Technologies, LLC, Waltham, MA (US)

(72) Inventor: John Bull, Nashua, NH (US)

(73) Assignee: Alegeus Technologies, LLC, Waltham, MA (US)

( * ) Notice: Subject to any disclaimer, the term of this patent is extended or adjusted under 35 U.S.C. 154(b) by 157 days.

(21) Appl. No.: 16/175,209

(22) Filed: Oct. 30, 2018

(65) Prior Publication Data

US 2020/0004576 A1 Jan. 2, 2020

Related U.S. Application Data

(60) Provisional application No. 62/692,154, filed on Jun. 29, 2018.

(51) Int. Cl.
| | |
|---|---|
| *G06F 9/46* | (2006.01) |
| *G06F 16/22* | (2019.01) |
| *G06F 16/23* | (2019.01) |
| *G06F 9/54* | (2006.01) |

(52) U.S. Cl.
CPC .............. *G06F 9/466* (2013.01); *G06F 9/547* (2013.01); *G06F 16/2246* (2019.01); *G06F 16/2365* (2019.01); *G06F 16/2379* (2019.01)

(58) Field of Classification Search
CPC ...... G06F 9/466; G06F 9/547; G06F 16/2379; G06F 16/2246; G06F 16/2365
See application file for complete search history.

(56) References Cited

U.S. PATENT DOCUMENTS 9,208,484 B2 * 12/2015 Bishop .................. G06Q 20/10

* cited by examiner

*Primary Examiner* — Jay A Morrison
(74) *Attorney, Agent, or Firm* — Foley & Lardner LLP

(57) ABSTRACT

The present solution is generally directed to dynamic state-driven centralized processing that manages remote procedure calls. In particular, the present solution can reduce the number of remote procedure calls by selecting and applying multiple processing scripts for a single electronic transaction based on a real-time condition, and provide dynamic-state-driven processing.

20 Claims, 18 Drawing Sheets

DYNAMIC STATE-DRIVEN CENTRALIZED PROCESSING

CROSS-REFERENCES TO RELATED APPLICATIONS

This application claims the benefit of priority under 35 U.S.C. § 119 to U.S. Provisional Patent Application No. 62/692,154, filed Jun. 29, 2018, which is hereby incorporated by reference herein in its entirety.

FIELD OF THE DISCLOSURE

The present solution is generally directed to dynamic state-driven centralized processing. In particular, the present solution can reduce the number of remote procedure calls by selecting and applying multiple processing scripts for a single electronic transaction based on a real-time condition, and maintaining a granular state.

BACKGROUND OF THE DISCLOSURE

Multiple entities can process electronic transactions associated with multiple electronic tax benefit accounts. Processing disparate electronic transactions can be inefficient, computationally intensive, and utilize excessive network bandwidth.

BRIEF SUMMARY OF THE DISCLOSURE

The systems and methods of the present solution are directed to the technical problems and challenges of processing disparate electronic transactions. The systems and methods of the present solution are directed to the improvement of the performance and operation of the electronic transaction based technology and platform and computing and networking resource used by such electronic transaction based technology and platform. In some aspects, the present solution improves and enhances the implemented functionality of the electronic transaction based technology and platform implemented on, integrated with and inherently tied to the processor, memory, network and computing resources of one or more computing devices. In some aspects, the present solution more effectively performs the functionality of the electronic transaction based technology and platform thereby making and causing more effective use of the computing and networking resources to achieve the improved functionality of the present solution. The same computing and network resources used by such electronic transaction based technology and platform will provide increased and improved functionality with implementation of the present solution.

In some aspects, systems and methods of the present solution are directed to dynamic state-driven centralized processing and managing remote procedure calls in centralized processing. A centralized state processing system can process electronic transactions on behalf of multiple entities. Each of those entities may have separate resources used to process electronic transactions associated with child entities. Thus, the centralized state processing system may be processing transactions for multiple entities as well as child entities that can be configured in a hierarchical tier structure. However, it may be challenging to accurately, reliably and efficiently process these electronic transactions when the available resources may be insufficient or unavailable. Thus, systems and methods of the present technical solution are directed to centrally processing electronic transactions in a manner that manages remote procedure calls.

For example, the present solution can provide a centralized state processing system configured with a communications interface, validator, script selector, and combiner. The centralized state processing system can intelligently select different processing scripts for even a single electronic transaction in order process the electronic transaction.

At least one aspect of the present disclosure is directed to a method of dynamic-state-driven centralized processing. The method can be performed by a centralized state processing system comprising one or more processors and memory. The method can include the centralized state processing system receiving a data structure constructed by a remote transaction processing server. The data structure can be constructed based on processing a plurality of electronic transactions that occurred within a spatiotemporal area. The data structure can include a plurality of entries that each have a type identifier. The method can include the centralized state processing system parsing the plurality of entries based on the type identifier to identify a first entry having a first type identifier and a second entry having a second type identifier. The method can include the centralized state processing system identifying, using a parameter repository storing a plurality of thresholds, a first threshold for the first entry based on the first type identifier, and a second threshold for the second entry based on the second type identifier. The method can include the centralized state processing system determining, based on a comparison between the first threshold and a first value of the first entry, a positive delta value. The method can include the centralized state processing system determining, based on a comparison between the second threshold and a second value of the second entry, a negative delta value. The method can include the centralized state processing system selecting, from a script repository, a first script to apply to the first entry based on the positive delta value and the first type identifier, and a second script to apply to the second entry based on the negative delta value and the second type identifier. The method can include the centralized state processing system determining a first output for the first entry using the first script, and a second output for the second entry using the second script. The method can include the centralized state processing system mapping the first output to a first state of a plurality of states of a distributed heterogeneous electronic transaction process. The method can include the centralized state processing system mapping the second output to a second state of the plurality of states the distributed heterogeneous electronic transaction process. The method can include the centralized state processing system determining a combined state based on the first state and the second state. The method can include the centralized state processing system providing, responsive to a request from a client device received via a computer network, via a hierarchical graphical tree structure, an indication of at least one of the combined state, the first state, or the second state.

In some embodiments, the plurality of states includes at least two of: partially authorized, partially transacted, applied to portion, reversed, or over-transacted. In some embodiments, the method can include the centralized state processing system providing a modified single data structure with the first output, the second output, the first state, the second state, and the combined state, the modified single data structure replacing one or more of the plurality of entries of the data structure.

In some embodiments, the method can include the centralized state processing system performing an error check process to validate each of the plurality of entries. In some embodiments, the method can include the centralized state processing system determining, based on an error check process, that an entry of the plurality of entries is at least one of an invalid identifier, missing a field, or a duplicate entry. The centralized state processing system can request, responsive to the error check process, an updated data structure from the remote transaction processing server.

In some embodiments, the method can include determining, based on the positive delta value, to apply the first script comprising an under-transaction technique. In some embodiments, the method can include determining, based on the positive delta value, to apply the first script comprising an under-transaction technique. The method can include performing, based on the under-transaction technique, an electronic transaction corresponding to the positive delta value.

In some embodiments, the method can include determining, based on the positive delta value, to apply the first script comprising an under-transaction technique. The under-transaction technique can include: determining that the centralized state processing system is to perform an electronic transaction corresponding to the positive delta value; determining that the first type identifier is not a crossover type; skipping, based on the first type identifier not the crossover type, an opt-in script; applying an offset; and conducting, by the centralized state processing system, an electronic transaction based on the offset.

In some embodiments, determining the second output using the second script can include determining, based on the negative delta value, to apply the second script comprising an over-transaction technique. The method can include performing, by the centralized state processing system, based on the over-transaction technique, an electronic transaction corresponding to the negative delta value. The over-transaction technique can include: determining that an original transaction type was external; determining than an adjusted transaction type corresponds to the centralized state processing system; determining that the second type identifier is not a crossover type; skipping, based on the second type identifier not the crossover type, an opt-in script; and reducing an electronic transaction amount based on the negative delta value.

At least one aspect is directed to a system for dynamic-state-driven centralized processing. The system can include a communication interface executed by one or more processors of a centralized state processing system configured to receive a data structure constructed by a remote transaction processing server based on processing a plurality of electronic transactions that occurred within a spatiotemporal area, the data structure including a plurality of entries that each have a type identifier. The system can include a script selector executed by the centralized state processing system configured to parse the plurality of entries based on the type identifier to identify a first entry having a first type identifier and a second entry having a second type identifier. The script selector can identify, using a parameter repository storing a plurality of thresholds, a first threshold for the first entry based on the first type identifier, and a second threshold for the second entry based on the second type identifier. The script selector can determine, based on a comparison between the first threshold and a first value of the first entry, a positive delta value. The script selector can determine, based on a comparison between the second threshold and a second value of the second entry, a negative delta value. The script selector can select, from a script repository, a first script to apply to the first entry based on the positive delta value and the first type identifier, and a second script to apply to the second entry based on the negative delta value and the second type identifier. The system can include a combiner executed by the centralized state processing system to determine a first output for the first entry using the first script, and a second output for the second entry using the second script. The system can include a state manager executed by the centralized state processing system configured to map the first output to a first state of a plurality of states a distributed heterogeneous electronic transaction process. The state manager can map the second output to a second state of the plurality of states the distributed heterogeneous electronic transaction process. The state manager can determine a combined state based on the first state and the second state. The state manager can provide, responsive to a request from a client device received via a computer network, via a hierarchical graphical tree structure, an indication of at least one of the combined state, the first state, or the second state.

In some embodiments, the plurality of states comprises at least two of: partially authorized, partially transacted, applied to portion, reversed, or over-transacted. In some embodiments, the centralized state processing system is further configured to provide a modified single data structure with the first output, the second output, the first state, the second state, and the combined state, the modified single data structure replacing one or more of the plurality of entries of the data structure.

In some embodiments, the centralized state processing system is further configured to perform an error check process to validate each of the plurality of entries. In some embodiments, the centralized state processing system is further configured to determine, based on an error check process, that an entry of the plurality of entries is at least one of an invalid identifier, missing a field, or a duplicate entry. The centralized state processing system can request, responsive to the error check process, an updated data structure from the remote transaction processing server.

The centralized state processing system can determine, based on the positive delta value, to apply the first script comprising an under-transaction technique. The centralized state processing system can determine, based on the positive delta value, to apply the first script comprising an under-transaction technique. The centralized state processing system can perform based on the under-transaction technique, an electronic transaction corresponding to the positive delta value. The under-transaction technique can include: determining that the centralized state processing system is to perform an electronic transaction corresponding to the positive delta value; determining that the first type identifier is not a crossover type; skipping, based on the first type identifier not the crossover type, an opt-in script; applying an offset; and conducting, by the centralized state processing system, an electronic transaction based on the offset.

In some embodiments, the centralized state processing system can determine, based on the negative delta value, to apply the second script comprising an over-transaction technique. The centralized state processing system can perform, based on the over-transaction technique, an electronic transaction corresponding to the negative delta value. The over-transaction technique can include: determining that an original transaction type was external; determining than an adjusted transaction type corresponds to the centralized state processing system; determining that the second type identifier is not a crossover type; skipping, based on the second type identifier not the crossover type, an opt-in script; and reducing, by the centralized state processing system, an electronic transaction amount based on the negative delta value.

BRIEF DESCRIPTION OF THE DRAWINGS

The foregoing and other objects, aspects, features, and advantages of the disclosure will become more apparent and better understood by referring to the following description taken in conjunction with the accompanying drawings, in which.

Figure 1A:
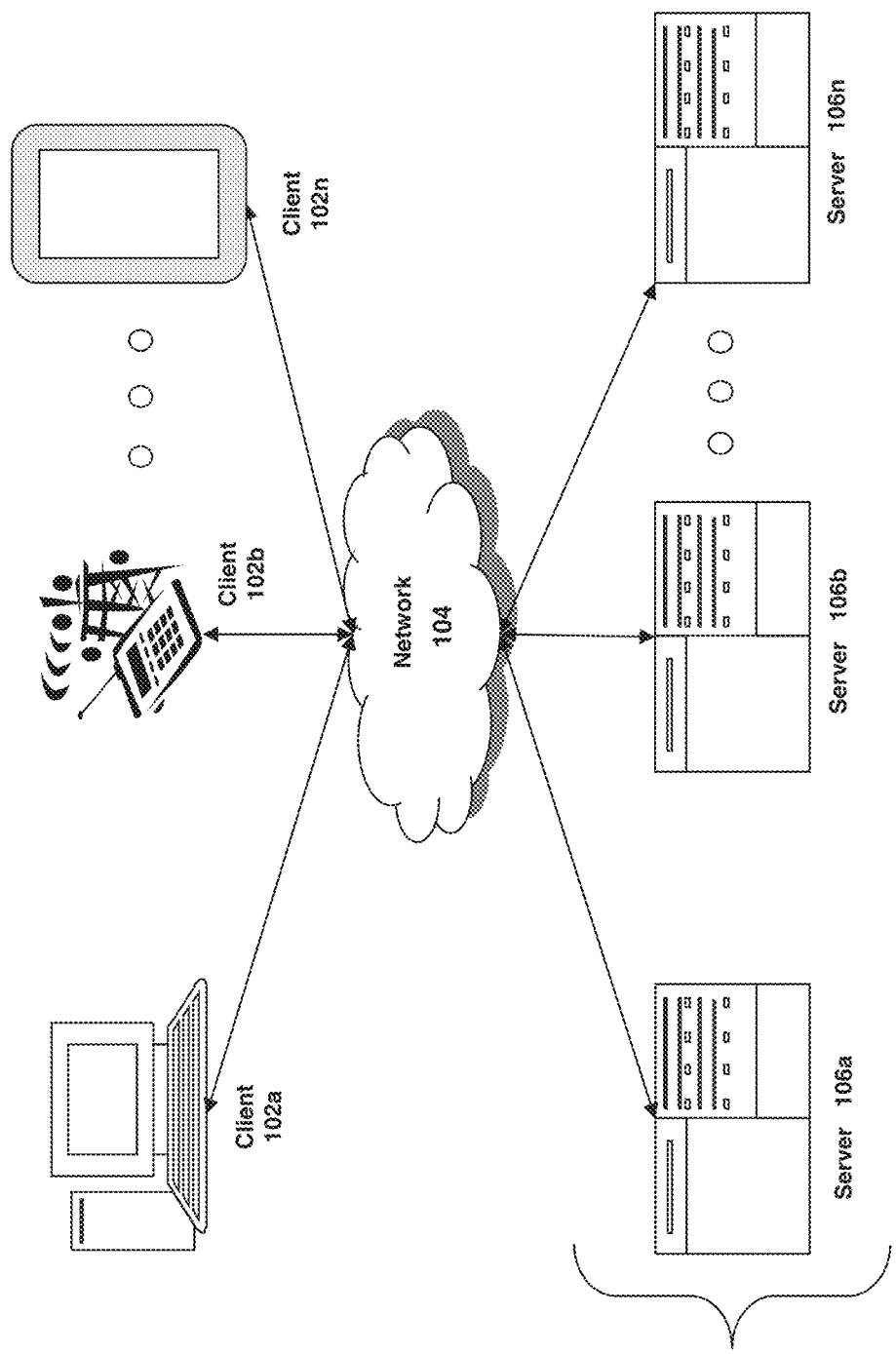
FIG. 1A is a block diagram depicting an embodiment of a network environment comprising client device in communication with server device.

The features and advantages of the present invention will become more apparent from the detailed description set forth below when taken in conjunction with the drawings, in which like reference characters identify corresponding elements throughout. In the drawings, like reference numbers generally indicate identical, functionally similar, or structurally similar elements.

DETAILED DESCRIPTION

For purposes of reading the description of the various embodiments below, the following descriptions of the sections of the specification and their respective contents can be helpful:

Section A describes a network environment and computing environment which can be useful for practicing embodiments described herein.

Section B describes embodiments of systems and methods for managing remote procedure calls in centralized processing.

Section C describes embodiments of systems and methods for dynamic-state-driven centralized processing.

A. Computing and Network Environment

Prior to discussing specific embodiments of the present solution, it can be helpful to describe aspects of the operating environment as well as associated system components (e.g., hardware elements) in connection with the methods and systems described herein. Referring to FIG. 1A, an embodiment of a network environment is depicted. In brief overview, the network environment includes one or more clients 102a-102n (also generally referred to as local machine(s) 102, client(s) 102, client node(s) 102, client machine(s) 102, client computer(s) 102, client device(s) 102, endpoint(s) 102, or endpoint node(s) 102) in communication with one or more servers 106a-106n (also generally referred to as server(s) 106, node 106, or remote machine(s) 106) via one or more networks 104. In some embodiments, a client 102 has the capacity to function as both a client node seeking access to resources provided by a server and as a server providing access to hosted resources for other clients 102a-102n.

Although FIG. 1A shows a network 104 between the clients 102 and the servers 106, the clients 102 and the servers 106 can be on the same network 104. In some embodiments, there are multiple networks 104 between the clients 102 and the servers 106. In one of these embodiments, a network 104' (not shown) can be a private network and a network 104 can be a public network. In another of these embodiments, a network 104 can be a private network and a network 104' a public network. In still another of these embodiments, networks 104 and 104' can both be private networks.

The network 104 can be connected via wired or wireless links. Wired links can include Digital Subscriber Line (DSL), coaxial cable lines, or optical fiber lines. The wireless links can include BLUETOOTH, Wi-Fi, Worldwide Interoperability for Microwave Access (WiMAX), an infrared channel or satellite band. The wireless links can also include any cellular network standards used to communicate among mobile devices, including standards that qualify as 1G, 2G, 3G, or 4G. The network standards can qualify as one or more generation of mobile telecommunication standards by fulfilling a specification or standards such as the specifications maintained by International Telecommunication Union. The 3G standards, for example, can correspond to the International Mobile Telecommunications-2000 (IMT-2000) specification, and the 4G standards can correspond to the International Mobile Telecommunications Advanced (IMT-Advanced) specification. Examples of cellular network standards include AMPS, GSM, GPRS, UMTS, LTE, LTE Advanced, Mobile WiMAX, and WiMAX-Advanced. Cellular network standards can use various channel access methods e.g. FDMA, TDMA, CDMA, or SDMA. In some embodiments, different types of data can be transmitted via different links and standards. In other embodiments, the same types of data can be transmitted via different links and standards.

The network 104 can be any type and/or form of network. The geographical scope of the network 104 can vary widely and the network 104 can be a body area network (BAN), a personal area network (PAN), a local-area network (LAN), e.g. Intranet, a metropolitan area network (MAN), a wide area network (WAN), or the Internet. The topology of the network 104 can be of any form and can include, e.g., any of the following: point-to-point, bus, star, ring, mesh, or tree. The network 104 can be an overlay network which is virtual and sits on top of one or more layers of other networks 104'.

The network 104 can be of any such network topology as known to those ordinarily skilled in the art capable of supporting the operations described herein. The network 104 can utilize different techniques and layers or stacks of protocols, including, e.g., the Ethernet protocol, the internet protocol suite (TCP/IP), the ATM (Asynchronous Transfer Mode) technique, the SONET (Synchronous Optical Networking) protocol, or the SDH (Synchronous Digital Hierarchy) protocol. The TCP/IP internet protocol suite can include application layer, transport layer, internet layer (including, e.g., IPv6), or the link layer. The network 104 can be a type of a broadcast network, a telecommunications network, a data communication network, or a computer network.

In some embodiments, the system can include multiple, logically-grouped servers 106. In one of these embodiments, the logical group of servers can be referred to as a server farm 38 or a machine farm 38. In another of these embodiments, the servers 106 can be geographically dispersed. In other embodiments, a machine farm 38 can be administered as a single entity. In still other embodiments, the machine farm 38 includes a plurality of machine farms 38. The servers 106 within each machine farm 38 can be heterogeneous—one or more of the servers 106 or machines 106 can operate according to one type of operating system platform (e.g., WINDOWS NT, manufactured by Microsoft Corp. of Redmond, Wash.), while one or more of the other servers 106 can operate on according to another type of operating system platform (e.g., Unix, Linux, or Mac OS X).

In one embodiment, servers 106 in the machine farm 38 can be stored in high-density rack systems, along with associated storage systems, and located in an enterprise data center. In this embodiment, consolidating the servers 106 in this way can improve system manageability, data security, the physical security of the system, and system performance by locating servers 106 and high performance storage systems on localized high performance networks. Centralizing the servers 106 and storage systems and coupling them with advanced system management tools allows more efficient use of server resources.

The servers 106 of each machine farm 38 do not need to be physically proximate to another server 106 in the same machine farm 38. Thus, the group of servers 106 logically grouped as a machine farm 38 can be interconnected using a wide-area network (WAN) connection or a metropolitan-area network (MAN) connection. For example, a machine farm 38 can include servers 106 physically located in different continents or different regions of a continent, country, state, city, campus, or room. Data transmission speeds between servers 106 in the machine farm 38 can be increased if the servers 106 are connected using a local-area network (LAN) connection or some form of direct connection. Additionally, a heterogeneous machine farm 38 can include one or more servers 106 operating according to a type of operating system, while one or more other servers 106 execute one or more types of hypervisors rather than operating systems. In these embodiments, hypervisors can be used to emulate virtual hardware, partition physical hardware, virtualize physical hardware, and execute virtual machines that provide access to computing environments, allowing multiple operating systems to run concurrently on a host computer. Native hypervisors can run directly on the host computer. Hypervisors can include VMware ESX/ESXi, manufactured by VMWare, Inc., of Palo Alto, Calif.; the Xen hypervisor, an open source product whose development is overseen by Citrix Systems, Inc.; the HYPER-V hypervisors provided by Microsoft or others. Hosted hypervisors can run within an operating system on a second software level. Examples of hosted hypervisors can include VMware Workstation and VIRTUALBOX.

Management of the machine farm 38 can be de-centralized. For example, one or more servers 106 can comprise components, subsystems and modules to support one or more management services for the machine farm 38. In one of these embodiments, one or more servers 106 provide functionality for management of dynamic data, including techniques for handling failover, data replication, and increasing the robustness of the machine farm 38. Each server 106 can communicate with a persistent store and, in some embodiments, with a dynamic store.

Server 106 can be a file server, application server, web server, proxy server, appliance, network appliance, gateway, gateway server, virtualization server, deployment server, SSL VPN server, or firewall. In one embodiment, the server 106 can be referred to as a remote machine or a node. In another embodiment, a plurality of nodes 290 can be in the path between any two communicating servers.

Figure 1B:
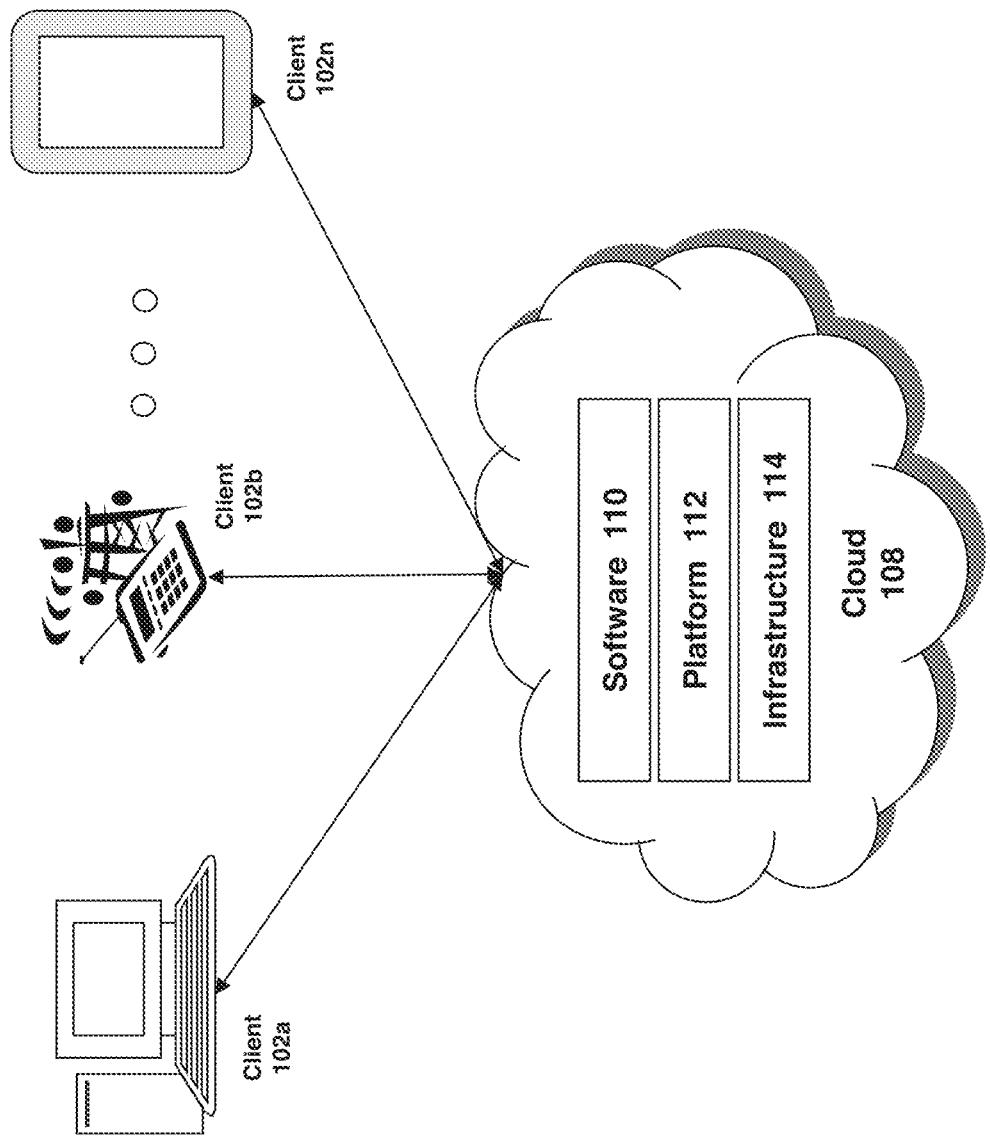
FIG. 1B is a block diagram depicting a cloud computing environment comprising a client device in communication with cloud service providers.

Referring to FIG. 1B, a cloud computing environment is depicted. A cloud computing environment can provide client 102 with one or more resources provided by a network environment. The cloud computing environment can include one or more clients 102a-102n, in communication with the cloud 108 over one or more networks 104. Clients 102 can include, e.g., thick clients, thin clients, and zero clients. A thick client can provide at least some functionality even when disconnected from the cloud 108 or servers 106. A thin client or a zero client can depend on the connection to the cloud 108 or server 106 to provide functionality. A zero client can depend on the cloud 108 or other networks 104 or servers 106 to retrieve operating system data for the client device. The cloud 108 can include back end platforms, e.g., servers 106, storage, server farms or data centers.

The cloud 108 can be public, private, or hybrid. Public clouds can include public servers 106 that are maintained by third parties to the clients 102 or the owners of the clients. The servers 106 can be located off-site in remote geographical locations as disclosed above or otherwise. Public clouds can be connected to the servers 106 over a public network. Private clouds can include private servers 106 that are physically maintained by clients 102 or owners of clients. Private clouds can be connected to the servers 106 over a private network 104. Hybrid clouds 108 can include both the private and public networks 104 and servers 106.

The cloud 108 can also include a cloud based delivery, e.g. Software as a Service (SaaS) 110, Platform as a Service (PaaS) 112, and Infrastructure as a Service (IaaS) 114. IaaS can refer to a user renting the use of infrastructure resources that are needed during a specified time period. IaaS providers can offer storage, networking, servers or virtualization resources from large pools, allowing the users to quickly scale up by accessing more resources as needed. Examples of IaaS can include infrastructure and services (e.g., EG-32) provided by OVH HOSTING of Montreal, Quebec, Canada, AMAZON WEB SERVICES provided by Amazon.com, Inc., of Seattle, Wash., RACKSPACE CLOUD provided by Rackspace US, Inc., of San Antonio, Tex., Google Compute Engine provided by Google Inc. of Mountain View, Calif., or RIGHTSCALE provided by RightScale, Inc., of Santa Barbara, Calif. PaaS providers can offer functionality provided by IaaS, including, e.g., storage, networking, servers or virtualization, as well as additional resources such as, e.g., the operating system, middleware, or runtime resources. Examples of PaaS include WINDOWS AZURE provided by Microsoft Corporation of Redmond, Wash., Google App Engine provided by Google Inc., and HEROKU provided by Heroku, Inc. of San Francisco, Calif. SaaS providers can offer the resources that PaaS provides, including storage, networking, servers, virtualization, operating system, middleware, or runtime resources. In some embodiments, SaaS providers can offer additional resources including, e.g., data and application resources. Examples of SaaS include GOOGLE APPS provided by Google Inc., SALESFORCE provided by Salesforce.com Inc. of San Francisco, Calif., or OFFICE 365 provided by Microsoft Corporation. Examples of SaaS can also include data storage providers, e.g. DROPBOX provided by Dropbox, Inc. of San Francisco, Calif., Microsoft SKYDRIVE provided by Microsoft Corporation, Google Drive provided by Google Inc., or Apple ICLOUD provided by Apple Inc. of Cupertino, Calif.

Clients 102 can access IaaS resources with one or more IaaS standards, including, e.g., Amazon Elastic Compute Cloud (EC2), Open Cloud Computing Interface (OCCI), Cloud Infrastructure Management Interface (CIMI), or OpenStack standards. Some IaaS standards can allow clients access to resources over HTTP, and can use Representational State Transfer (REST) protocol or Simple Object Access Protocol (SOAP). Clients 102 can access PaaS resources with different PaaS interfaces. Some PaaS interfaces use HTTP packages, standard Java APIs, JavaMail API, Java Data Objects (JDO), Java Persistence API (JPA), Python APIs, web integration APIs for different programming languages including, e.g., Rack for Ruby, WSGI for Python, or PSGI for Perl, or other APIs that can be built on REST, HTTP, XML, or other protocols. Clients 102 can access SaaS resources through the use of web-based user interfaces, provided by a web browser (e.g. GOOGLE CHROME, Microsoft INTERNET EXPLORER, or Mozilla Firefox provided by Mozilla Foundation of Mountain View, Calif.). Clients 102 can also access SaaS resources through smartphone or tablet applications, including, e.g., Salesforce Sales Cloud, or Google Drive app. Clients 102 can also access SaaS resources through the client operating system, including, e.g., Windows file system for DROPBOX.

In some embodiments, access to IaaS, PaaS, or SaaS resources can be authenticated. For example, a server or authentication server can authenticate a user via security certificates, HTTPS, or API keys. API keys can include various encryption standards such as, e.g., Advanced Encryption Standard (AES). Data resources can be sent over Transport Layer Security (TLS) or Secure Sockets Layer (SSL).

Figure 1C:
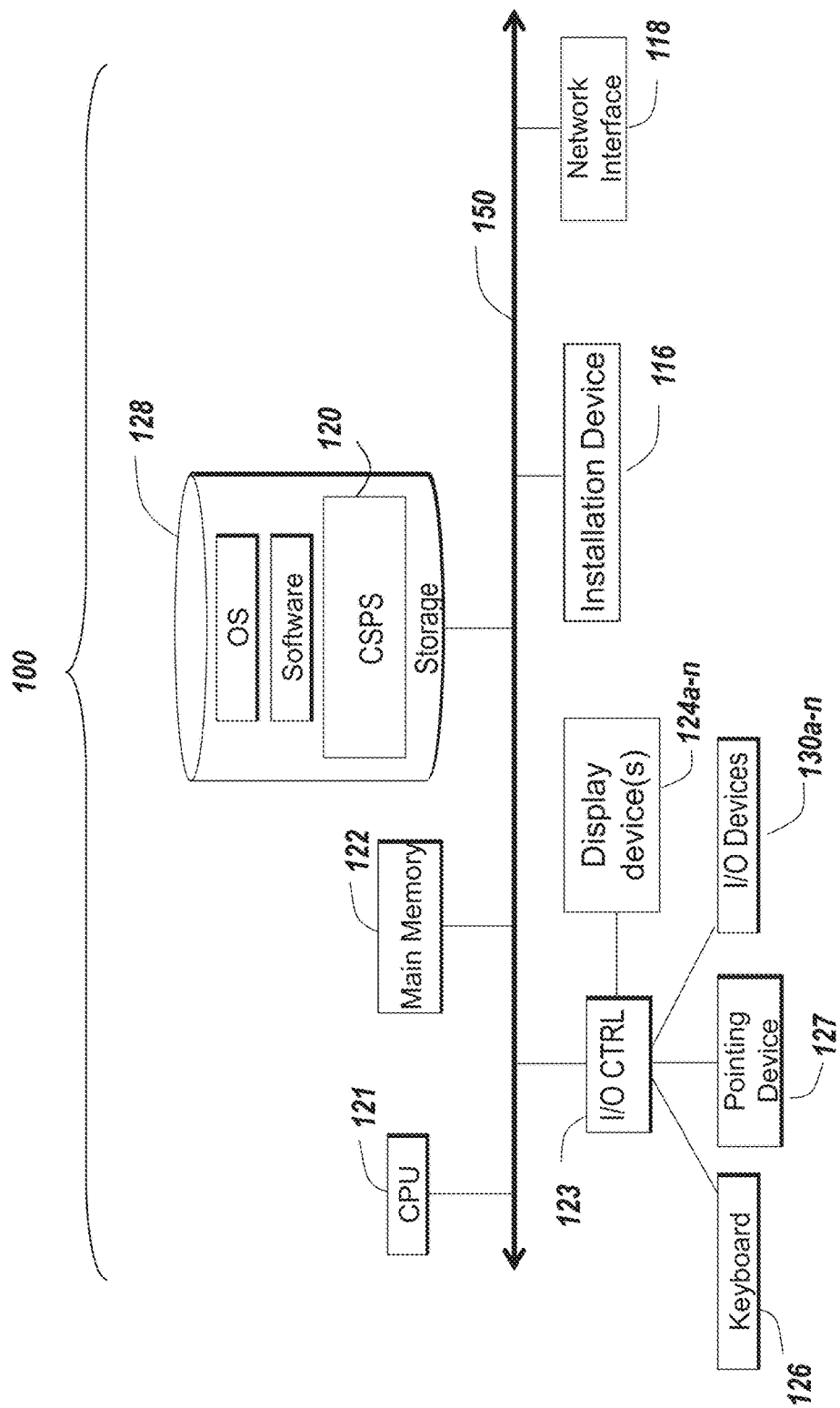
FIGS. 1C and 1D are block diagrams depicting embodiments of computing devices useful in connection with the methods and systems described herein.
Figure 1D:
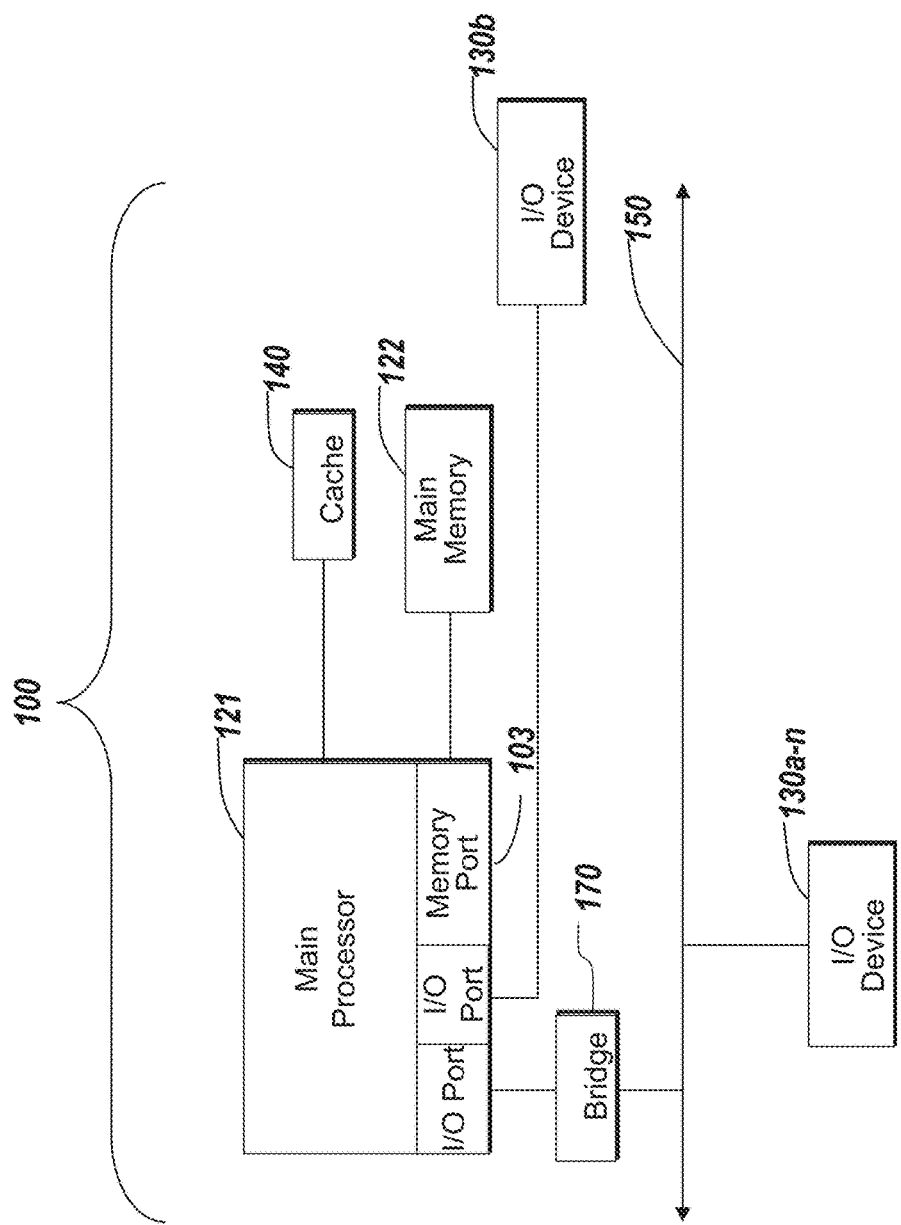

The client 102 and server 106 can be deployed as and/or executed on any type and form of computing device, e.g. a computer, network device or appliance capable of communicating on any type and form of network and performing the operations described herein. FIGS. 1C and 1D depict block diagrams of a computing device 100 useful for practicing an embodiment of the client 102 or a server 106. As shown in FIGS. 1C and 1D, each computing device 100 includes a central processing unit 121, and a main memory unit 122. As shown in FIG. 1C, a computing device 100 can include a storage device 128, an installation device 116, a network interface 118, an I/O controller 123, display devices 124a-124n, a keyboard 126 and a pointing device 127, e.g. a mouse. The storage device 128 can include, without limitation, an operating system, software, and a software of a centralized state processing system (CSPS) 120. As shown in FIG. 1D, each computing device 100 can also include additional optional elements, e.g. a memory port 103, a bridge 170, one or more input/output devices 130a-130n (generally referred to using reference numeral 130), and a cache memory 140 in communication with the central processing unit 121.

The central processing unit 121 is any logic circuitry that responds to and processes instructions fetched from the main memory unit 122. In many embodiments, the central processing unit 121 is provided by a microprocessor unit, e.g.: those manufactured by Intel Corporation of Mountain View, Calif.; those manufactured by Motorola Corporation of Schaumburg, Ill.; the ARM processor and TEGRA system on a chip (SoC) manufactured by Nvidia of Santa Clara, Calif.; the POWER7 processor, those manufactured by International Business Machines of White Plains, N.Y.; or those manufactured by Advanced Micro Devices of Sunnyvale, Calif. The computing device 100 can be based on any of these processors, or any other processor capable of operating as described herein. The central processing unit 121 can utilize instruction level parallelism, thread level parallelism, different levels of cache, and multi-core processors. A multi-core processor can include two or more processing units on a single computing component. Examples of multi-core processors include the AMID PHENOM IIX2, INTEL CORE i5 and INTEL CORE i7.

Main memory unit 122 can include one or more memory chips capable of storing data and allowing any storage location to be directly accessed by the microprocessor 121. Main memory unit 122 can be volatile and faster than storage 128 memory. Main memory units 122 can be Dynamic random access memory (DRAM) or any variants, including static random access memory (SRAM), Burst SRAM or SynchBurst SRAM (BSRAM), Fast Page Mode DRAM (FPM DRAM), Enhanced DRAM (EDRAM), Extended Data Output RAM (EDO RAM), Extended Data Output DRAM (EDO DRAM), Burst Extended Data Output DRAM (BEDO DRAM), Single Data Rate Synchronous DRAM (SDR SDRAM), Double Data Rate SDRAM (DDR SDRAM), Direct Rambus DRAM (DRDRAM), or Extreme Data Rate DRAM (XDR DRAM). In some embodiments, the main memory 122 or the storage 128 can be non-volatile; e.g., non-volatile read access memory (NVRAM), flash memory non-volatile static RAM (nvSRAM), Ferroelectric RAM (FeRAM), Magnetoresistive RAM (MRAM), Phase-change memory (PRAM), conductive-bridging RAM (CBRAM), Silicon-Oxide-Nitride-Oxide-Silicon (SONOS), Resistive RAM (RRAM), Racetrack, Nano-RAM (NRAM), or Millipede memory. The main memory 122 can be based on any of the above described memory chips, or any other available memory chips capable of operating as described herein. In the embodiment shown in FIG. 1C, the processor 121 communicates with main memory 122 via a system bus 150 (described in more detail below). FIG. 1D depicts an embodiment of a computing device 100 in which the processor communicates directly with main memory 122 via a memory port 103. For example, in FIG. 1D the main memory 122 can be DRDRAM.

FIG. 1D depicts an embodiment in which the main processor 121 communicates directly with cache memory 140 via a secondary bus, sometimes referred to as a backside bus. In other embodiments, the main processor 121 communicates with cache memory 140 using the system bus 150. Cache memory 140 typically has a faster response time than main memory 122 and is typically provided by SRAM, BSRAM, or EDRAM. In the embodiment shown in FIG. 1D, the processor 121 communicates with various I/O devices 130 via a local system bus 150. Various buses can be used to connect the central processing unit 121 to any of the I/O devices 130, including a PCI bus, a PCI-X bus, or a PCI-Express bus, or a NuBus. For embodiments in which the I/O device is a video display 124, the processor 121 can use an Advanced Graphics Port (AGP) to communicate with the display 124 or the I/O controller 123 for the display 124. FIG. 1D depicts an embodiment of a computer 100 in which the main processor 121 communicates directly with I/O device 130b or other processors 121' via HYPERTRANSPORT, RAPIDIO, or INFINIBAND communications technology. FIG. 1D also depicts an embodiment in which local busses and direct communication are mixed: the processor 121 communicates with I/O device 130a using a local interconnect bus while communicating with I/O device 130b directly.

A wide variety of I/O devices 130a-130n can be present in the computing device 100. Input devices can include keyboards, mice, trackpads, trackballs, touchpads, touch mice, multi-touch touchpads and touch mice, microphones, multi-array microphones, drawing tablets, cameras, single-lens reflex camera (SLR), digital SLR (DSLR), CMOS sensors, accelerometers, infrared optical sensors, pressure sensors, magnetometer sensors, angular rate sensors, depth sensors, proximity sensors, ambient light sensors, gyroscopic sensors, or other sensors. Output devices can include video displays, graphical displays, speakers, headphones, inkjet printers, laser printers, and 3D printers.

Devices 130a-130n can include a combination of multiple input or output devices, including, e.g., Microsoft KINECT, Nintendo Wiimote for the WII, Nintendo WII U GAMEPAD, or Apple IPHONE. Some devices 130a-130n allow gesture recognition inputs through combining some of the inputs and outputs. Some devices 130a-130n provides for facial recognition which can be utilized as an input for different purposes including authentication and other commands. Some devices 130a-130n provides for voice recognition and inputs, including, e.g., Microsoft KINECT, SIRI for IPHONE by Apple, Google Now or Google Voice Search.

Additional devices 130a-130n have both input and output capabilities, including, e.g., haptic feedback devices, touchscreen displays, or multi-touch displays. Touchscreen, multi-touch displays, touchpads, touch mice, or other touch sensing devices can use different technologies to sense touch, including, e.g., capacitive, surface capacitive, projected capacitive touch (PCT), in-cell capacitive, resistive, infrared, waveguide, dispersive signal touch (DST), in-cell optical, surface acoustic wave (SAW), bending wave touch (BWT), or force-based sensing technologies. Some multi-touch devices can allow two or more contact points with the surface, allowing advanced functionality including, e.g., pinch, spread, rotate, scroll, or other gestures. Some touchscreen devices, including, e.g., Microsoft PIXELSENSE or Multi-Touch Collaboration Wall, can have larger surfaces, such as on a table-top or on a wall, and can also interact with other electronic devices. Some I/O devices 130a-130n, display devices 124a-124n or group of devices can be augment reality devices. The I/O devices can be controlled by an I/O controller 123 as shown in FIG. 1C. The I/O controller can control one or more I/O devices, such as, e.g., a keyboard 126 and a pointing device 127, e.g., a mouse or optical pen. Furthermore, an I/O device can also provide storage and/or an installation medium 116 for the computing device 100. In still other embodiments, the computing device 100 can provide USB connections (not shown) to receive handheld USB storage devices. In further embodiments, an I/O device 130 can be a bridge between the system bus 150 and an external communication bus, e.g. a USB bus, a SCSI bus, a FireWire bus, an Ethernet bus, a Gigabit Ethernet bus, a Fibre Channel bus, or a Thunderbolt bus.

In some embodiments, display devices 124a-124n can be connected to I/O controller 123. Display devices can include, e.g., liquid crystal displays (LCD), thin film transistor LCD (TFT-LCD), blue phase LCD, electronic papers (e-ink) displays, flexile displays, light emitting diode displays (LED), digital light processing (DLP) displays, liquid crystal on silicon (LCOS) displays, organic light-emitting diode (OLED) displays, active-matrix organic light-emitting diode (AMOLED) displays, liquid crystal laser displays, time-multiplexed optical shutter (TMOS) displays, or 3D displays. Examples of 3D displays can use, e.g. stereoscopy, polarization filters, active shutters, or autostereoscopy. Display devices 124a-124n can also be a head-mounted display (HMD). In some embodiments, display devices 124a-124n or the corresponding I/O controllers 123 can be controlled through or have hardware support for OPENGL or DIRECTX API or other graphics libraries.

In some embodiments, the computing device 100 can include or connect to multiple display devices 124a-124n, which each can be of the same or different type and/or form. As such, any of the I/O devices 130a-130n and/or the I/O controller 123 can include any type and/or form of suitable hardware, software, or combination of hardware and software to support, enable or provide for the connection and use of multiple display devices 124a-124n by the computing device 100. For example, the computing device 100 can include any type and/or form of video adapter, video card, driver, and/or library to interface, communicate, connect or otherwise use the display devices 124a-124n. In one embodiment, a video adapter can include multiple connectors to interface to multiple display devices 124a-124n. In other embodiments, the computing device 100 can include multiple video adapters, with each video adapter connected to one or more of the display devices 124a-124n. In some embodiments, any portion of the operating system of the computing device 100 can be configured for using multiple displays 124a-124n. In other embodiments, one or more of the display devices 124a-124n can be provided by one or more other computing devices 100a or 100b connected to the computing device 100, via the network 104. In some embodiments software can be designed and constructed to use another computer's display device as a second display device 124a for the computing device 100. For example, in one embodiment, an Apple iPad can connect to a computing device 100 and use the display of the device 100 as an additional display screen that can be used as an extended desktop. One ordinarily skilled in the art will recognize and appreciate the various ways and embodiments that a computing device 100 can be configured to have multiple display devices 124a-124n.

Referring again to FIG. 1C, the computing device 100 can comprise a storage device 128 (e.g. one or more hard disk drives or redundant arrays of independent disks) for storing an operating system or other related software, and for storing application software programs such as any program related to the software 120 for the centralized state processing system. Examples of storage device 128 include, e.g., hard disk drive (HDD); optical drive including CD drive, DVD drive, or BLU-RAY drive; solid-state drive (SSD); USB flash drive; or any other device suitable for storing data. Some storage devices can include multiple volatile and non-volatile memories, including, e.g., solid state hybrid drives that combine hard disks with solid state cache. Some storage device 128 can be non-volatile, mutable, or read-only. Some storage device 128 can be internal and connect to the computing device 100 via a bus 150. Some storage device 128 can be external and connect to the computing device 100 via a I/O device 130 that provides an external bus. Some storage device 128 can connect to the computing device 100 via the network interface 118 over a network 104, including, e.g., the Remote Disk for MACBOOK AIR by Apple. Some client devices 100 may not require a non-volatile storage device 128 and can be thin clients or zero clients 102. Some storage device 128 can also be used as an installation device 116, and can be suitable for installing software and programs. Additionally, the operating system and the software can be run from a bootable medium, for example, a bootable CD, e.g. KNOPPIX, a bootable CD for GNU/Linux that is available as a GNU/Linux distribution from knoppix.net.

Client device 100 can also install software or application from an application distribution platform. Examples of application distribution platforms include the App Store for iOS provided by Apple, Inc., the Mac App Store provided by Apple, Inc., GOOGLE PLAY for Android OS provided by Google Inc., Chrome Webstore for CHROME OS provided by Google Inc., and Amazon Appstore for Android OS and KINDLE FIRE provided by Amazon.com, Inc. An application distribution platform can facilitate installation of software on a client device 102. An application distribution platform can include a repository of applications on a server 106 or a cloud 108, which the clients 102a-102n can access over a network 104. An application distribution platform can include application developed and provided by various developers. A user of a client device 102 can select, purchase and/or download an application via the application distribution platform.

Furthermore, the computing device 100 can include a network interface 118 to interface to the network 104 through a variety of connections including, but not limited to, standard telephone lines LAN or WAN links (e.g., 802.11, T1, T3, Gigabit Ethernet, Infiniband), broadband connections (e.g., ISDN, Frame Relay, ATM, Gigabit Ethernet, Ethernet-over-SONET, ADSL, VDSL, BPON, GPON, fiber optical including FiOS), wireless connections, or some combination of any or all of the above. Connections can be established using a variety of communication protocols (e.g., TCP/IP, Ethernet, ARCNET, SONET, SDH, Fiber Distributed Data Interface (FDDI), IEEE 802.11a/b/g/n/ac CDMA, GSM, WiMax and direct asynchronous connections). In one embodiment, the computing device 100 communicates with other computing devices 100' via any type and/or form of gateway or tunneling protocol e.g. Secure Socket Layer (SSL) or Transport Layer Security (TLS), or the Citrix Gateway Protocol manufactured by Citrix Systems, Inc. of Ft. Lauderdale, Fla. The network interface 118 can comprise a built-in network adapter, network interface card, PCMCIA network card, EXPRESSCARD network card, card bus network adapter, wireless network adapter, USB network adapter, modem or any other device suitable for interfacing the computing device 100 to any type of network capable of communication and performing the operations described herein.

A computing device 100 of the sort depicted in FIGS. 1B and 1C can operate under the control of an operating system, which controls scheduling of tasks and access to system resources. The computing device 100 can be running any operating system such as any of the versions of the MICROSOFT WINDOWS operating systems, the different releases of the Unix and Linux operating systems, any version of the MAC OS for Macintosh computers, any embedded operating system, any real-time operating system, any open source operating system, any proprietary operating system, any operating systems for mobile computing devices, or any other operating system capable of running on the computing device and performing the operations described herein. Typical operating systems include, but are not limited to: WINDOWS 2000, WINDOWS Server 2012, WINDOWS CE, WINDOWS Phone, WINDOWS XP, WINDOWS VISTA, and WINDOWS 7, WINDOWS RT, and WINDOWS 8 all of which are manufactured by Microsoft Corporation of Redmond, Wash.; MAC OS and iOS, manufactured by Apple, Inc. of Cupertino, Calif.; and Linux, a freely-available operating system, e.g. Linux Mint distribution ("distro") or Ubuntu, distributed by Canonical Ltd. of London, United Kingdom; or Unix or other Unix-like derivative operating systems; and Android, designed by Google, of Mountain View, Calif., among others. Some operating systems, including, e.g., the CHROME OS by Google, can be used on zero clients or thin clients, including, e.g., CHROMEBOOKS.

The computer system 100 can be any workstation, telephone, desktop computer, laptop or notebook computer, netbook, ULTRABOOK, tablet, server, handheld computer, mobile telephone, smartphone or other portable telecommunications device, media playing device, a gaming system, mobile computing device, or any other type and/or form of computing, telecommunications or media device that is capable of communication. The computer system 100 has sufficient processor power and memory capacity to perform the operations described herein. In some embodiments, the computing device 100 can have different processors, operating systems, and input devices consistent with the device. The Samsung GALAXY smartphones, e.g., operate under the control of Android operating system developed by Google, Inc. GALAXY smartphones receive input via a touch interface.

In some embodiments, the computing device 100 is a gaming system. For example, the computer system 100 can comprise a PLAYSTATION 3, or PERSONAL PLAYSTATION PORTABLE (PSP), or a PLAYSTATION VITA device manufactured by the Sony Corporation of Tokyo, Japan, a NINTENDO DS, NINTENDO 3DS, NINTENDO WII, or a NINTENDO WII U device manufactured by Nintendo Co., Ltd., of Kyoto, Japan, an XBOX 360 device manufactured by the Microsoft Corporation of Redmond, Wash.

In some embodiments, the computing device 100 is a digital audio player such as the Apple IPOD, IPOD Touch, and IPOD NANO lines of devices, manufactured by Apple Computer of Cupertino, Calif. Some digital audio players can have other functionality, including, e.g., a gaming system or any functionality made available by an application from a digital application distribution platform. For example, the IPOD Touch can access the Apple App Store. In some embodiments, the computing device 100 is a portable media player or digital audio player supporting file formats including, but not limited to, MP3, WAV, M4A/AAC, WMA Protected AAC, AIFF, Audible audiobook, Apple Lossless audio file formats and .mov, .m4v, and .mp4 MPEG-4 (H.264/MPEG-4 AVC) video file formats.

In some embodiments, the computing device 100 is a tablet e.g. the IPAD line of devices by Apple; GALAXY TAB family of devices by Samsung; or KINDLE FIRE, by Amazon.com, Inc. of Seattle, Wash. In other embodiments, the computing device 100 is an eBook reader, e.g. the KINDLE family of devices by Amazon.com, or NOOK family of devices by Barnes & Noble, Inc. of New York City, N.Y.

In some embodiments, the communications device 102 includes a combination of devices, e.g. a smartphone combined with a digital audio player or portable media player. For example, one of these embodiments is a smartphone, e.g. the IPHONE family of smartphones manufactured by Apple, Inc.; a Samsung GALAXY family of smartphones manufactured by Samsung, Inc.; or a Motorola DROID family of smartphones. In yet another embodiment, the communications device 102 is a laptop or desktop computer equipped with a web browser and a microphone and speaker system, e.g. a telephony headset. In these embodiments, the communications devices 102 are web-enabled and can receive and initiate phone calls. In some embodiments, a laptop or desktop computer is also equipped with a webcam or other video capture device that enables video chat and video call.

In some embodiments, the status of one or more machines 102, 106 in the network 104 are monitored, generally as part of network management. In one of these embodiments, the status of a machine can include an identification of load information (e.g., the number of processes on the machine, CPU and memory utilization), of port information (e.g., the number of available communication ports and the port addresses), or of session status (e.g., the duration and type of processes, and whether a process is active or idle). In another of these embodiments, this information can be identified by a plurality of metrics, and the plurality of metrics can be applied at least in part towards decisions in load distribution, network traffic management, and network failure recovery as well as any aspects of operations of the present solution described herein. Aspects of the operating environments and components described above will become apparent in the context of the systems and methods disclosed herein.

B. Managing Remote Procedure Calls in Centralized Processing

Systems and methods of the present solution are directed to managing remote procedure calls in centralized processing. A centralized state processing system can process electronic transactions on behalf of multiple entities. Each of those entities may have separate resources used to process electronic transactions associated with child entities. Thus, the centralized state processing system may be processing transactions for multiple entities as well as child entities that can be configured in a hierarchical tier structure.

The systems and methods of the present solution are directed to the technical problems and challenges of processing disparate electronic transactions. The systems and methods of the present solution are directed to the improvement of the performance and operation of the electronic transaction based technology and platform and computing and networking resource used by such electronic transaction based technology and platform. In some aspects, the present solution improves and enhances the implemented functionality of the electronic transaction based technology and platform implemented on, integrated with and inherently tied to the processor, memory, network and computing resources of one or more computing devices. In some aspects, the present solution more effectively performs the functionality of the electronic transaction based technology and platform thereby making and causing more effective use of the computing and networking resources to achieve the improved functionality of the present solution. The same computing and network resources used by such electronic transaction based technology and platform will provide increased and improved functionality with implementation of the present solution.

In some aspects, systems and methods of the present solution are directed to managing remote procedure calls in centralized processing. A centralized state processing system can process electronic transactions on behalf of multiple entities. Each of those entities may have separate resources used to process electronic transactions associated with child entities. Thus, the centralized state processing system may be processing transactions for multiple entities as well as child entities that can be configured in a hierarchical tier structure. However, it may be challenging to accurately, reliably and efficiently process these electronic transactions when the available resources may be insufficient or unavailable. Thus, systems and methods of the present technical solution are directed to centrally processing electronic transactions in a manner that manages remote procedure calls.

For example, the present solution can provide a centralized state processing system configured with a communications interface, validator, script selector, and combiner. The centralized state processing system can intelligently select different processing scripts for even a single electronic transaction in order process the electronic transaction. Thus, instead of a single electronic transactions being forwarded to multiple processing servers or initiating multiple database queries or server requests, the centralized processing system can identify each of the different components of the electronic transaction up-front, select the corresponding or matching script, and then apply the processing script. In some cases, the centralized processing system can apply a parallel processing technique in order to execute multiple scripts for various components of the same electronic transaction.

In an illustrative example, a visit to a primary care physician can cost $150. This can be charged to insurance. The insurance can have a $25 co-pay paid out of pocket through an FSA account. However, if the insurance carrier adjusts that claim and then realizes that the provider is out of network or not a Preferred provider, then that $25 responsibility could go up or down based on the insurance carrier self-adjusting the claim. The present technical solution can be configured with one or more rules and execute one or more scripts to determine how to process this electronic transaction in real-time (e.g., responsive to receiving the electronic transaction or data structure thereof).

Further, an insurance carrier can have an insurance claim with multiple components or entries (e.g., charge for bed, charge for MRI, charge for procedures, etc.). All the services provided can be part of one bill, but each service can be listed out as an individual line item or entry, and each one may have a different coverage rate, etc. Thus, from an insurance standpoint, the insurer may be paying a different amount for prescription drugs versus other expenses incurred. The CSPS of the present technical solution can separate out the multiple charges and process them using different scripts, and then combine them together as a single expense. Thus, the present technical solution can process a single hospital visit with multiple line items. The CSPS can align with an insurance carrier claim (e.g, a remote transaction processing server or third-party administrator device) to store multiple expenses and process them into one overall claim. The CSPS can track the level of detail in the system. For example, if the insurance carrier adjusts a first line item, the CSPS can track each line item and account for each individual adjustments. While the individual entries or line items may be grouped into a single visit, the CSPS can execute different scripts to process them independently and differently.

Thus, the CSPS, by using different scripts to process different entries or line items, can improve the execution or operation of the computing system by more efficiently selecting the proper processing flow. Further, by performing a pre-processing error check, the CSPS can reduce the number of errors caused by this functionality.

Figure 2:
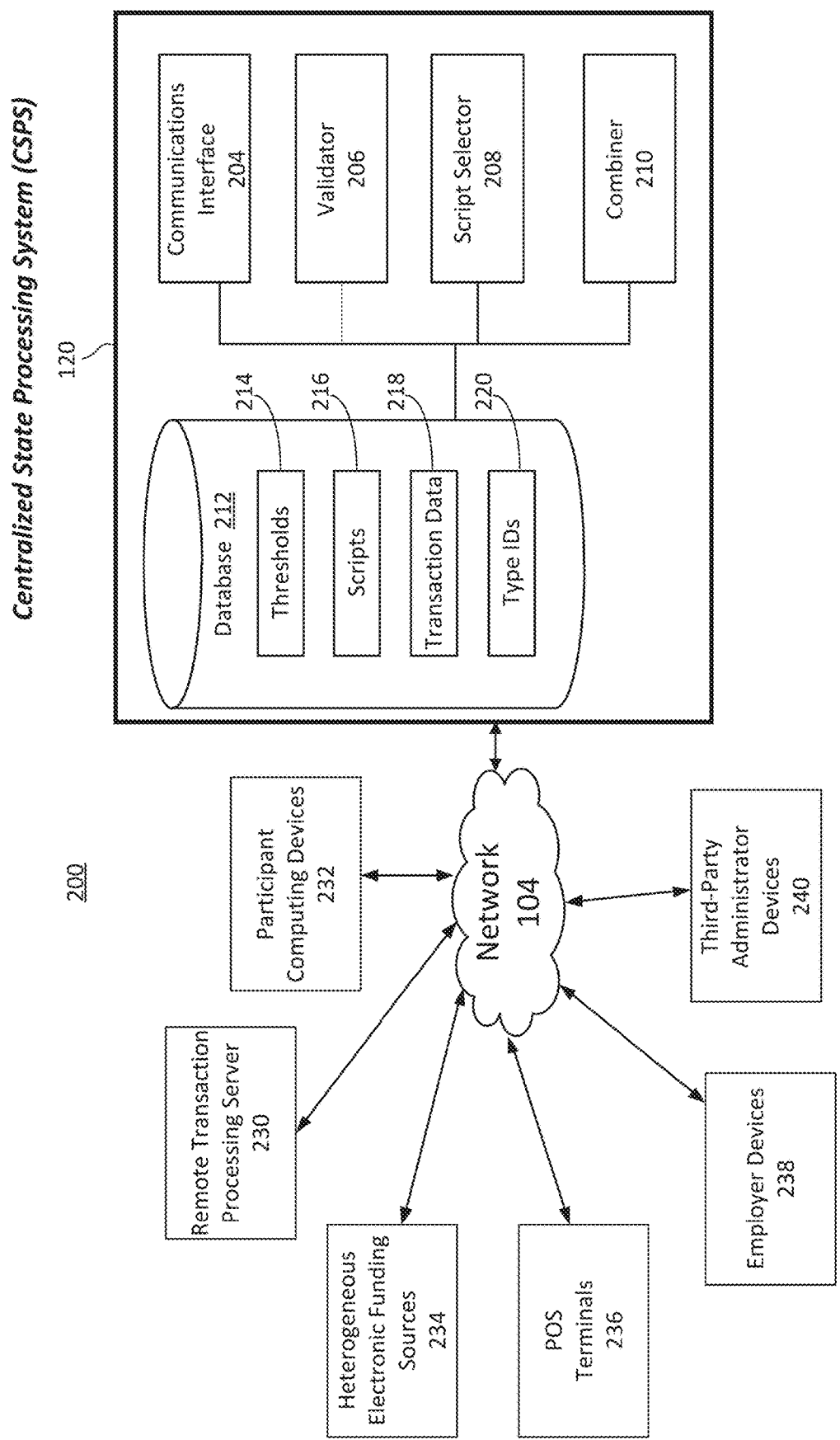
FIG. 2 is a block diagram depicting an embodiment of a system to manage remote procedure calls in centralized processing.

Referring now to FIG. 2, a block diagram depicting an embodiment of a system 200 comprising a centralized state processing system is shown. In brief overview, the system 200 includes a centralized state processing system 120 ("CSPS") that can receive and/or transmit data via a network 104 with participant computing devices 232, third-party administrator devices 240, employer devices 238, point-of-sale terminals 236, heterogeneous electronic funding sources 234, or remote transaction servers 230. The CSPS 120 can include a communications interface 204 that is configured with one or more communications ports, application programming interfaces, network protocols (e.g., TCP/IP), authentication protocols, or security protocols (e.g., SSL). The CSPS 120 can include, interface with, or otherwise access a validator 206 that performs an error checking process on the entries in an electronic transaction. The CSPS 120 can include, interface with, or otherwise access a script selector 208 that separates out the entries and selects a matching script to use to process each of the entries based on a type of the entry. The CSPS 120 can include, interface with, or otherwise access a combiner 210 that can apply or execute the selected scripts and consolidate or generate a combined output that can reduce the number of outputs or subsequent or downstream remote procedure calls or requests. The CSPS 120 can include one or more databases or data structure that store information to facilitate the systems and methods of the present solution, such as database 212 or repository. The database 212 can include data structures, files or otherwise categorize or store information, code, or scripts. For example, the database 212 can include or store a thresholds 214 data structure or data file, a scripts 216 data structure or data file or folder, transaction data 218 or type identifiers ("IDs") 220.

The system 120, communications interface 204, validator 206, script selector 208, and combiner 210 can each include one or more processing units or other logic devices such as programmable logic array engines, modules, or circuitry designed and constructed to facilitate managing security on a network infrastructure. The CSPS 120 can include the components 100 shown in FIG. 1C or FIG. 1D, or be configured to operate as a service in cloud 108. The CSPS 120 can include or interact with one or more servers 106a-n and clients 102a-n. The participant computing devices 232, POS terminals 236, employer devices 238, TPA devices 240, heterogeneous electronic funding sources 234, or remote transaction servers 230 can each include one or more component or functionality of client computing devices 102a-n or server 106a-n. The remote transaction server 230 can refer to or include one or more of a heterogeneous electronic funding source 234 or third-party administrator device 240.

In some embodiments, the CSPS 120 can employ a multitier architecture such as a client-server architecture in which presentation, application processing, and data management functions are logically or physically separated. The presentation tier, or front-end, can include the communications interface 204 that can serve static content or dynamic content to be rendered by the client 102 (e.g., by a web browser executing on client 102). The presentation tier or web server can interact or communicate with the application tier to obtain data to provide to the client 102, computing devices, 232, TPA devices 240, employer devices 238, funding sources 234, remote transaction server 230, or POS terminals 120a-n. The application tier can include the validator 206, script selector 208, and combiner 210 that controls the system's functionality and performs additional processing or analysis on data. The application tier can interact with the data tier to obtain the transaction data. The data tier can include data persistence mechanisms (database servers, file shares, etc.) and the data access layer that encapsulates the persistence mechanisms and exposes the data. The data tier can include databases 212. The data tier can include an application programming interface (API) to the application tier. The databases 212 can include stored procedures (e.g., SQL statements) that perform tasks with respect the stored data.

The system 200 can include, access, or otherwise communicate with one or more third-part administrator ("TPA") devices 240 or remote transaction servers 230. A TPA can refer to an organization that processes insurance claims or certain aspects of employee benefit plans for a separate entity. A TPA can refer to organizations within the insurance industry which "administer" other services such as Underwriting or Customer Service. In some cases, a TPA can handle the claims processing for employers 238 that self-insures its employees 232. Thus, the employers 238 are acting as an insurance company and underwrites the risk. The risk of loss can remains with the employer 238, and not with the TPA 240. An insurance company may also use a TPA 240 to manage its claims processing, provider networks, utilization review, or membership functions. The TPA 240 can handle many aspects of other employee benefit plans such as the processing of retirement plans and flexible spending accounts. Many employee benefit plans have highly technical aspects and difficult administration that can make using a specialized entity such as a TPA 240 more cost effective than doing the same processing in house.

In the health care industry, for example, TPAs 240 can administer all or a portion of the claims process. TPAs 240 can be contracted by a health insurer or self-insuring companies to administer services, including claims administration, premium collection, enrollment and other administrative activities. For example, an employer 238 may choose to help finance the health care costs of its employees 232 by contracting with a TPA 240 to administer many aspects of a self-funded health care plan.

Administrators, such as companies or health insurance providers, can establish electronic benefits accounts such as flexible spending accounts or healthcare tax benefit accounts (e.g., health savings accounts) for participants such as employees, subscribers, or customers. These electronic benefits accounts can provide a tax advantage for the participants. Administrators that establish or provide electronic tax benefits accounts for various participants of those accounts can utilize backend information technology infrastructure to process, analyze, monitor or manage the electronic tax benefits accounts. The tax benefit management information technology infrastructure can be configured with processing rules that are applied to electronic transactions. Electronic transactions can include allocating funds to the tax benefit account, withdrawing funds from the tax benefit account, making a purchase with funds from the tax benefit account, modifying a profile of the tax benefit account, or submitting a claim. The management information technology infrastructure can apply one or more rules to each type of transaction to determine an event. As the types of transactions and rules increase in number and complexity, the types and events can also increase in number and complexity, thereby consuming an increasing amount of resources of the information technology infrastructure. For example, events such as a card denial increases the number of transaction attempts, communications with the server, account resets, profile corruption, or resources consumed by a point-of-sale device initiating the transaction.

The employer devices 238 can refer to a device used by an entity or organization that is associated with the participant computing devices 232 of the employees of the employer. For example, Employer A can be a software company that has a thousand employees associated with the participant computing devices 232. The employees can obtain health care or other services, and pay for those services at a POS terminal 236 of the service provider.

Data packets can be generated by a device 240 at an administrator. The device can refer to an administrator device ("administrator device") such as administrator device 240. The administrator device 240 may monitor data from the various electronic benefits accounts associated with the administrator. An account can refer to an electronic data structure or arrangement of data. The electronic data structure can include fields, entries, or values that provide an arrangement of data. The accounts associated with the administrator may be accounts that are managed or maintained by the administrator. The administrator may be a point of contact for customers or participants of the associated accounts. In some embodiments, the client 102, which may correspond to an individual participant of the administrator's electronic benefits account, may access the account and perform a number of actions with respect to the account, such as, fund the account (e.g., via heterogeneous electronic funding sources 234), withdraw from the account, charge the account, and the like. The administrator of the electronic benefits account, as the caretaker of the account, may adjust parameters associated with the account, such as, monthly fees, minimum running balances, etc. At the same time, the CSPS 120 may monitor the data, parameters, and performance of the account and store the information under an administrator profile associated with the administrator of the account. The CSPS 120 may receive the data associated with the individual participants and their individual accounts from the client's 102 and the parameter data associated with the accounts from the administrator device 240 via the network 104.

An administrator device 240 can be the place where an administrator may perform various functions of the administrator, for example, functions associated with electronic benefits accounts of the administrator. The administrator device 240 is the point at an administrator that may send requests or transaction information to the CSPS 120 for further processing or data collection. The administrator device 240 may also be configured to transmit an identifier associated with the administrator corresponding to the administrator device 240 for identification by the CSPS 120. In some embodiments, the receiving of the identifier initiates a fraud detection and control process.

The administrator device 240 can include hardware and software. Administrators can utilize scanners, EFTPOS terminals, touch screens and any other wide variety of hardware and software available for use with administrator device 240. For example, an administrator can use software to make adjustments to parameters associated with their electronic benefits accounts.

The administrator device 240 can include advanced features to cater to different functionality, such as account participant forecasts and estimates, account simulation, communication with participants of accounts, performing actions associated with individual participant accounts (e.g., freezing an account), collecting data from one or more of the participant accounts, etc., all built into the administrator software. The administrator device 240 can be configured to execute user-input commands with respect to the electronic benefits accounts of the administrator.

In some embodiments, the communication interface 204 can receive data packets. The data packets can carry one or more electronic transactions. In some cases, the data packets can carry multiple electronic transactions. In some cases, the data packets can be received over a duration of time. The electronic transactions can occur over the duration of time. In some cases, the electronic transaction information carried via the data packets can be received by the CSPS 120 in real-time, such as responsive to the occurrence of the electronic transaction. In some cases, the CSPS 120 can receive the information about the electronic transactions in a bulk upload or batch upload. Receiving the information about the electronic transaction sin a bulk upload or batch upload can reduce computing resource utilization or network bandwidth usage, thereby improving the efficiency of the CSPS 120. For example, the provider of the information about the electronic transactions can compress the information and generate data packets carrying the compressed information in a single batch or bulk transmission, thereby reducing network bandwidth utilization.

The electronic transaction information carried via the data packets can include information that facilitates performance of the electronic transaction, or analyzing the electronic transaction to detect fraudulent activity. The electronic transaction can a source identifier pointing to a data structure storing a resource, a destination identifier corresponding to a data structure to transfer the resource, and an intermediary identifier corresponding to an entity that provides at least a portion of the resource stored in the data structure. The source identifier can refer to an account identifier that contains the resource being transferred from a source to a destination. The source identifier can refer to an account of an employee of an employer. The source identifier can correspond to an account associated with a participant computing device 232. The resource can correspond to an electronic resource or physical resource being represented in an electronic form. The resource can refer to or include a token, currency, points, or other resource that can be transferred from the source to a destination. The destination identifier an correspond to an entity or organization receiving the resource. The destination identifier can correspond to a provider of a service or good that is receiving the resource in return for performing the service or providing the good to the employee. The intermediary identifier can correspond to an entity that stores, holds, manages, provides, or maintains the resource. The intermediary identifier can refer to or correspond to the employer device 238, a heterogeneous electronic funding source 234 or TPA 240.

An identifier corresponding to a data structure can refer to or include an identifier pointing to a data structure, such as a memory pointer. The identifier corresponding to a data structure can refer to or include an identifier used by a lookup to retrieve, identify, access or select the data structure. The identifier can label the data structure. The identifier can be mapped to the data structure.

The data packets or electronic transaction can be generated by a device at a merchant to conduct an electronic transaction at the merchant. The device can refer to a point of sale terminal ("POS terminal") such as POS terminal 236. In some embodiments, the POS terminals 236 are the devices at which retail transactions are initiated. The POS terminals 236 are the points at which a customer of the entity or merchant makes a payment to the merchant in exchange for goods or services. At the point of sale the merchant can calculate the amount owed by the customer and provide options for the customer to make payment. The merchant can also issue a receipt for the transaction.

The POS terminal 236 can include hardware and software. Merchants can utilize weighing scales, scanners, electronic and manual cash registers, EFTPOS terminals, touch screens and any other wide variety of hardware and software available for use with POS terminal 236. For example, a pharmacy can use software to customize the item or service sold when a customer has a special medication request.

The POS terminal 236 can include advanced features to cater to different functionality, such as inventory management, CRM, financials, warehousing, flexible spending account transactions, etc., all built into the POS software. The POS terminal 236 can be configured to conduct a transactions using a debit card, multipurse card, Bluetooth, near field communications, smartphone, smartwatch, mobile telecommunications computing device, wearable communications, RFID, etc.

The CSPS 120 can include a communications interface 204. The communications interface 204 can execute on one or more processors of a server. The communications interface 204 can include one or more communications ports and be configured with one or more network protocols. Communications ports can include, e.g., network ports, Ethernet ports, WAN ports, I/O ports, or software ports. The communication port can be configured with a network protocol such as Transport Layer Protocols such as TCP/IP or UDP that are configured to receive and process data packets received via a computer network. The port can include or be associated with an IP address of a host and a protocol type of the communication.

The communications interface 204 can receive data packets generated by the POS terminal 236 responsive to an electronic transaction resulting in transmission of a request to adjudicate a single claim against an electronic benefits account. The data packets can carry a data structure or include a data structure. The communications interface 204 can receive a data structure constructed by a remote transaction server 230 or third-party administrator device 240. The remote transaction server 230 can construct the data structure based on multiple electronic transactions that occurred within a spatiotemporal area. The data structure can include multiple entries that each have a type identifier.

In some embodiments, the data structure can be constructed by the remote transaction processing server 230 responsive to a request to adjudicate a claim. The claim can include multiple entries or have multiple claims. For example, the claim can include multiple claims or entries incurred over an extended stay at a hospital.

The request to adjudicate the claim (or multiple claims) against the electronic benefits account can be transmitted responsive to one or more instances of a user swiping a payment card at the POS terminal 236. The payment card can include identifying information that can be used to identify an account identifier of the electronic benefit account (e.g., source identifier) against which to adjudicate the claim. The data packets can include header information and payload information. Multiple data packets can be strung together in a sequence. The header information can refer to TCP/IP headers that include fields such as source port, destination port, sequence number, acknowledge number, window size, etc. The payload information of the data packet can include information related to the electronic transaction, the request to adjudicate a single claim, the merchant, or the customer. The CSPS 120 can receive the data packet with header information and payload information and process the packets to obtain information for further processing. The payload can include data identifying the POS terminal 236 (e.g., POS terminal 236a) at which the electronic transaction occurred, the merchant providing the POS terminal 236a, a merchant category of the merchant, financial information associated with the user performing the electronic transaction (e.g., via a card swipe or other communication technique used to perform the electronic transaction), an amount of expenditures of the electronic transaction, and other information facilitating adjudication of the single claim. The data packets (e.g., via the payload) can include the request to adjudicate the single claim. The request can specify the electronic benefits account for adjudication. The request can specify information for identifying a policy for performing the adjudication. The payload can include data identifying a merchant category of the merchant, an electronic benefits account, and a monetary amount of the electronic transaction.

The data packets can carry data identifying a merchant or merchant category of the merchant. In some embodiments, the data carried by the data packets include a merchant category code or identifier (e.g., dental, medical, etc.). In some embodiments, the data identifies a merchant, and the CSPS 120 determines a merchant category based on the identification of the merchant by, for example, using a merchant to merchant category mapping or lookup table stored in database. In some embodiments, the data packets carrying the request to adjudicate the single claim against the electronic benefits account include a data structure having a first field indicating a merchant identifier, a second field indicating a total amount of expenditures, and a third field indicating the electronics benefit account. In some embodiments, the data packets are generated by a merchant device (e.g., a client device 102 of a merchant) to conduct an electronic transaction at the merchant, and the data packets carry data identifying a merchant category of the merchant, the electronic benefits account maintained and configured on the CSPS 120, and a total monetary amount of the electronic transaction.

The data packets (e.g., payload of the data packets) can further identify an electronic account maintained and configured on the server. The electronic account can be maintained and configured in a database 212. The electronic account can correspond to a user and have a unique identifier. The unique identifier can include numbers, letters, characters, symbols, etc. The electronic account can be associated with the customer making the transaction at the merchant. The POS terminal 236a can receive or determine the electronic account identifier via a card swipe or other communication technique employed at the POS terminal 236a, which the POS 236a can then convey to the CSPS 120.

The remote transaction processing server 230 can combine the individual claims or data packets into a data structure including multiple electronic transaction that all occurred at the same spatiotemporal area, such as a hospital visit that lasted one or more days but can be considered a single visit.

The communications interface 120 can further receive data packets (e.g., payload information) identifying a monetary amount of the electronic transaction, such as a total amount of expenditures. The monetary amount can be for the purchase of goods or services made at the merchant. The monetary amount of the transaction can refer to the amount of funds in consideration for goods or services obtained from the entity or merchant. The merchant or entity can refer to the entity at which a point-of-sale terminal or device used to make the transaction is located or with which the terminal is associated. The monetary amount can be in any currency (e.g., United States dollars) or units. The monetary amount can be further tied to a category, such as medical services.

In some embodiments, the POS terminal 236a can generate multiple data packets for a single transaction. The multiple data packets can each include a header and a payload. The header can indicate that the multiple data packets are to be grouped together for routing, transmission or processing purposes.

The CSPS 120 can be configured to authenticate communications and transactions. In some embodiments, the communications interface 204 receives communications such as the request to adjudicate the single claim. The request can include security credential such as a security certificate or security token. The security credential can be associated with a user or a merchant. The CSPS 120 can be configured to extract the security credential from the request, and authenticate the request by comparing the security credential against a known or verified security credential. For example, the user profiles and/or merchant information stored in database 212 can include known or verified security credentials for comparison with the security credential of the request. In some embodiments, the CSPS 120 receives the request to adjudicate the single claim via the communications interface 204, extracts a security credential from the request, analyzes the extracted security credential to identify a user, queries the database 212 for a verified security credential stored with a user profile corresponding to the identified user, compares the extracted security credential to the verified security credential, and authenticates the request based on the extracted security credential matching the verified security credential. In some embodiments, the CSPS 120 analyzes the extracted security credential to identify a merchant, queries the database 212 for a verified security credential stored with merchant information corresponding to the identified merchant, compares the extracted security credential to the verified security credential, and authenticates the request based on the extracted security credential matching the verified security credential.

In some embodiments, the communications interface 210 can receive data packets. The data packets can be generated by a first device at a first merchant to conduct a first electronic transaction at the first merchant. The first device can refer to a POS terminal such as POS terminal 120a. A point of sale terminal 120 ("POS") is the place where a retail transaction is completed. The POS terminal 120 is the point at which a customer of the entity or merchant makes a payment to the merchant in exchange for goods or services. At the point of sale the merchant can calculate the amount owed by the customer and provide options for the customer to make payment. The merchant can also issue a receipt for the transaction.

The POS terminal 120 can include hardware and software. Merchants can utilize weighing scales, scanners, electronic and manual cash registers, EFTPOS terminals, touch screens and any other wide variety of hardware and software available for use with POS terminal 120. For example, a pharmacy can use software to customize the item or service sold when a customer has a special medication request.

The POS terminal 120 can include advanced features to cater to different functionality, such as inventory management, CRM, financials, warehousing, flexible spending account transactions, etc., all built into the POS software.

The point of sale terminal 120 can be configured to conduct a transactions using a debit card, multipurse card, Bluetooth, near field communications, smartphone, smartwatch, mobile telecommunications computing device, wearable communications, RFID, etc.

The communications interface 210 can receive data packets generated by the POS Terminal 120 responsive to conducting an electronic transaction. The data packets can include header information and payload information. Multiple data packets can be strung together in a sequence. The header information can refer to TCP/IP headers that include fields such as source port, destination port, sequence number, acknowledgment number, window size, etc. The payload information of the data packet can include information related to the transaction, merchant, or customer. The system 120 can receive the data packet with header information and payload information and process the packets to obtain information for further processing. The payload can include data identifying a first merchant category of the first merchant, an electronic account, and a monetary amount of the electronic transaction.

The data packets can carry data identifying a merchant or merchant category of the merchant. In some embodiments, the data carried by the data packets include a merchant category code or identifier (e.g., dental, medical, etc.). In some embodiments, the data identifies a merchant, and the system 120 determines a merchant category based on the identification of the merchant by, for example, using a merchant to merchant category mapping or lookup table stored in database 212.

The data packets (e.g., payload of the data packets) can further identify an electronic account maintained and configured on the server. The electronic account can be maintained and configured in a database 212. The electronic account can correspond to a user and have a unique identifier. The unique identifier can include numbers, letters, characters, symbols, etc. The electronic account can be associated with the customer making the transaction at the merchant. The POS terminal 236a can receive or determine the electronic account identifier via a card swipe or other communication technique employed at the POS terminal 236a, which the POS 236a can then convey to the system 120.

The communications interface 204 can further receive data packets (e.g., payload information) identifying a first monetary amount of the first electronic transaction. The monetary amount can be for the purchase of goods or services made at the merchant. The monetary amount of the transaction can refer to the amount of funds in consideration for goods or services obtained from the entity or merchant. The merchant or entity can refer to the entity at which a point-of-sale terminal or device used to make the transaction is located or with which the terminal is associated. The monetary amount can be in any currency (e.g., United States dollars) or units. The monetary amount can be further tied to a category, such as medical services.

In some embodiments, the POS terminal 236a can generate multiple data packets for a single transaction. The multiple data packets can each include a header and a payload. The header can indicate that the multiple data packets are to be grouped together for routing, transmission or processing purposes.

The CSPS 120 can include a validator 206 designed, constructed and operational to perform an error check process to validate each of the plurality of entries in the data structure. The validator 206 can determine whether there is an error, fraud, mistake, or other issue in the data structure.

If the validator 206 detects an error or issue, the validator 206 can correct the issue, or cease further downstream processing on the data structure, thereby reducing unnecessary processing and preventing further crashes, errors, or remote procedure calls. The validator 206 can be configured with one or more error checking processes. The validator 206 can be configured with specific error checking processes. The validator 206 can be configured with templates, formats, regular expressions, scripts, parsing techniques, rules, policies or other tools that facilitate validating the data structure or identifying an error.

For example, the validator 206 can parse the multiple entries in the data structure to identify an invalid identifier for an entry, a missing field, or a duplicate entry. To do so, the validator 206 can access a template of type IDs 220 stored in database 212 and perform a comparison between the template type IDs and the identifiers in the data structure. If the validator 206 determines that an identifier in the data structure does not correspond to predetermined identifier stored in database 212, the validator 206 can resolve the error. For example, the validator 206 can remove the entry from the multiple entries in the data structure prior to providing the data structure to the script selector 208 for further processing.

The validator 206 can determine whether a field is missing from the data structure or from an entry in the data structure. The validator 206 can determine if a field is missing based on comparing the data structure or entry with a predetermined template data structure or predetermined template entry. The validator 206 can determine the field is missing based on identifying, in the data structure, an invalid value for the field (e.g., a null value or a value having a type that is not configured for the field).

The validator 206 can determine that there is a duplicate entry in the data structure using a deduplication technique or processor. Responsive to the error check process, the validator 206 can remove the entry with the issue from the plurality of entries prior to forwarding the data structure to the script selector 208 for separation. In some cases, the validator 206 can request, responsive to the error check process, an updated data structure from the remote transaction processing server 230. For example, the validator 206 can transmit a request to the remote transaction processing server 230 to correct the entry or entries with the detected issue.

The CSPS 120 can include a script selector 208 designed, constructed and operational to select a script to apply or use to process an entry in the data structure. The script selector 208 can select multiple scripts to apply to the received data structure based on the characteristics associated with each entry in the data structure, for example.

The script selector 206 can receive the data structure that has been validated or corrected via the error check process performed by the validator 206. The script selector 208 can parse the data structure or the entries of the data structure to identify entries with different type identifiers. The script selector 208 can parse the data structure and entries to identify a first one or more entries having a first type identifier, and a second one or more entries having a second type identifier.

The script selector 206 can separate the entries based on the type identifier to identify a first set of entries having a first type identifier and a second set of entries having a second type identifier. The script selector 206 can receive the type identifiers from data repository 212. For example, the script selector 206 can apply a filter using type identifiers in order to remove one or more entries based on a comparison with a predetermined list of type identifiers. The script selector 206 can remove entries that do not correspond to a predetermined type identifier. The script selector 206 can categorize or bucketize the entries based on the type identifier.

The script selector 206 can identify or retrieve thresholds 214 from the database 212. For example, a parameter repository (such as database 212) can store thresholds 214. The thresholds 214 can include a first threshold and a second threshold. The first threshold can correspond to the first type identifier. The second threshold can correspond to the second type identifier. The thresholds 214 can include additional thresholds that can correspond to different types of identifiers. The thresholds 214 can be numeric thresholds, ranges, binary values, or other values or alphanumeric values that can facilitate selecting a script to apply.

The script selector 208 can compare the threshold with a value associated with a set of entry to determine a delta value. For example, the script selector 208 can compare the first threshold for the first type identifier with a first value of the first set of entries to determine a positive delta value. The script selector 208 can compare the second threshold for the second type identifier with a second value of the second set of entries to determine a negative delta value.

Responsive to detecting the positive delta value and the first type identifier for the first set of entries, the script selector 208 can select a first script to apply to the first set of entries. Responsive to detecting the negative delta value and the second type identifier for the second set of entries, the script selector 208 can select a second script to apply to the second set of entries. The script selector 208 can select the script from a scripts repository, such as scripts 216 stored in database 212.

The script selector 208 can determine, based on the positive delta value, to apply the first script comprising an under-transaction technique. The under-transaction technique can include determining that the first type identifier is not a crossover type and then skipping, based on the first type identifier not being the crossover type, an opt-in script. The system 120 can, pursuant to the under-transaction technique, apply an offset and then conduct the electronic transaction based on the offset.

The script selector 208 can determine, based on a negative delta value, to select a the second script comprising an over-transaction technique. The over-transaction technique can include determining that an original transaction type was external. The over-transaction technique can include determining than an adjusted transaction type corresponds to the centralized state processing system. The over-transaction technique can include determining that the second type identifier is not a crossover type. The over-transaction technique can include skipping an opt-in script based on the second type identifier not being the crossover type. The over-transaction technique can include reducing an electronic transaction amount based on the negative delta value. The centralized state processing system can perform the over-transaction technique on an electronic transaction having a negative delta value.

Thus, the script selector 208 can determine, based on a total value of the modified data structure, to initiate one of an under-transaction technique or an over-transaction technique.

The CSPS 120 can include a combiner 210 designed, constructed and operational to execute the scripts selected by the script selector 208 in order to generate an output. For example, the combiner 210 can use the first script selected by the script selector 208 to determine a first output for the first set of entries. The combiner 210 can use the second script selected by the script selector 208 to determine a second output for the second set of entries. The combiner 210 can execute or process the first and second scripts in parallel, thereby reducing latency or delay in processing, and decreasing the amount of time taken to process the data structure relative to processing the scripts serially or one after the other. The combiner 210 can provide a modified data structure that combines the first output and the second output. The modified data structure can replace one or more of the plurality of entries of the data structure.

The combiner 210 can perform an electronic transaction corresponding to the positive delta value based on the under-transaction technique. For example, as part of executing the under-transaction technique, the combiner 210 can determine that the first type identifier is not a crossover type and then skip, based on the first type identifier not being the crossover type, an opt-in script. The combiner 210 can, pursuant to the under-transaction technique, apply an offset and then conduct the electronic transaction based on the offset.

Further, the combiner 210 can execute the over-transaction technique for the list of entries corresponding to a negative delta value. For example, the combiner 210 can determine that an original transaction type was external. The combiner 210 can determine than an adjusted transaction type corresponds to the centralized state processing system. The combiner 210 can determine that the second type identifier is not a crossover type. The combiner 210 can skip an opt-in script based on the second type identifier not being the crossover type. The combiner 210 can reduce an electronic transaction amount based on the negative delta value.

Thus, the present technical solution can provide an improved system 200 or improve the functioning of system 200 itself using software, hardware or a combination thereof. The system 200 can more efficiently interface with remote systems, as well reduce the number of interactions between remote systems by more efficiently processing electronic transactions.

Figure 3:
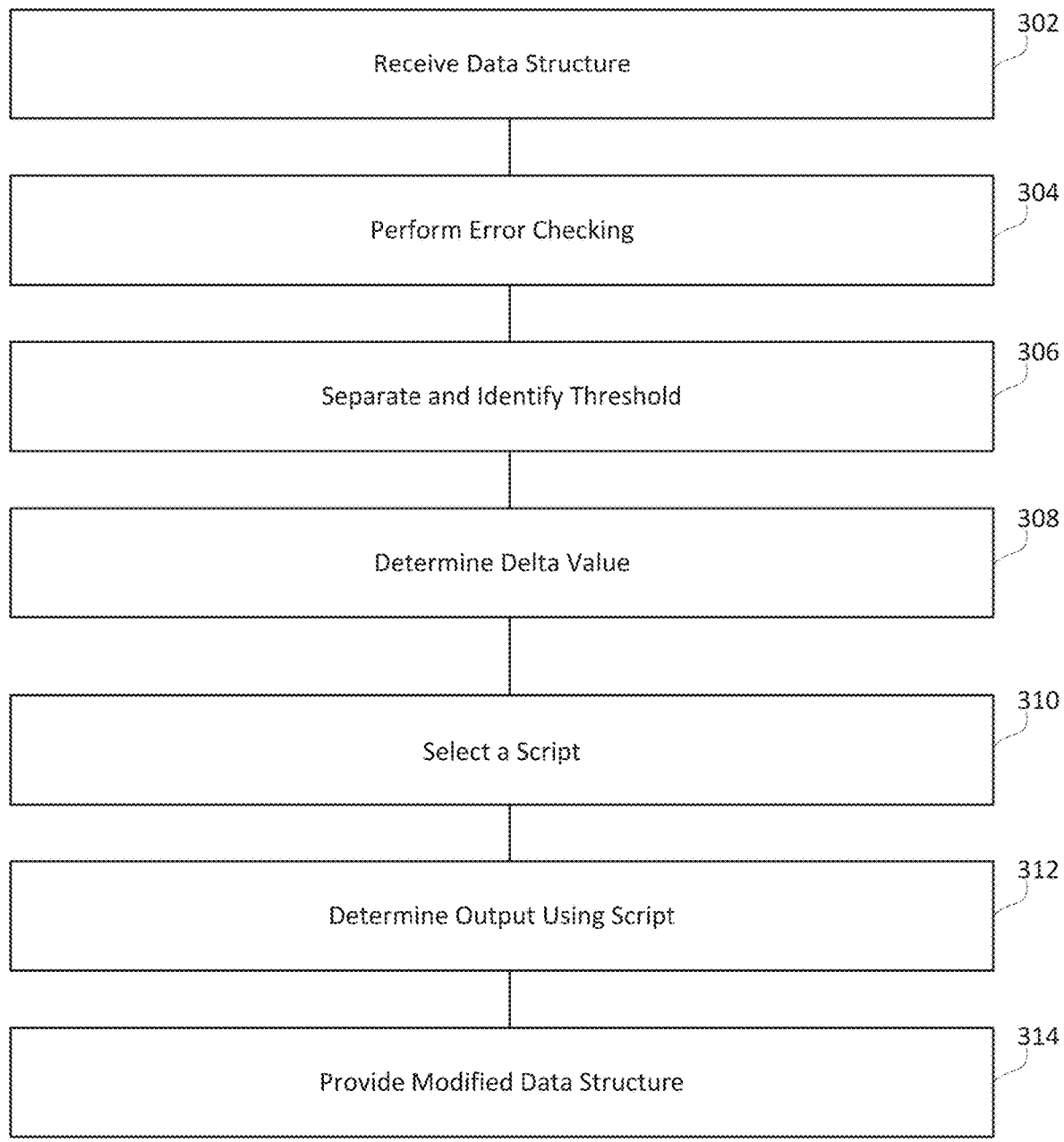
FIG. 3 is a flow diagram depicting an embodiment of a method of managing remote procedure calls in centralized processing.

Referring now to FIG. 3, a method of managing remote procedure calls in centralized processing in accordance with an embodiment is provided. The method 300 can be performed using one or more system or component depicted in FIGS. 1A-1D or FIG. 2, including, for example, a centralized state processing system, communications interface, validator, script selector, and combiner. In brief overview, the method 300 can include a centralized state processing system ("CSPS") receiving a data structure at step 302. At step 304, the CSPS can perform error checking. At 306, the CSPS can separate a list of entries in the data structure and identify a threshold. At 308, the CSPS can determine a delta value. At 310, the CSPS can select a script. At 312, the CSPS can determine an output using the script. At 314, the CSPS can provide a modified data structure.

Still referring to FIG. 3, and in further detail, the method 300 can include the CSPS receiving a data structure at step 302. The data structure can carry multiple electronic transactions. The CSPS can receive the data structure via a network. The CSPS can retrieve the data structure from a database. The CSPS can receive the data structure in real-time, or a bulk upload or batch process. For example, the CSPS can receive data packets comprising the data structure during a batch process that occurs on a periodic basis, such as every 24 hours, 12 hours, 36 hours or some other time interval. The CSPS can receive the data packets responsive to a trigger condition or event, such as a request from an administrator of the CSPS, alarm condition, notification, etc.

The data structure can be constructed by a remote transaction processing server based on processing a plurality of electronic transactions that occurred within a spatiotemporal area. The data structure can include a plurality of entries that each have a type identifier.

At step 304, the CSPS can perform error checking. The CSPS can perform an error check process to validate the entries in the data structure. The validation can refer to or include identify issues in entries in the data structure, such as missing fields, invalid values in a field, or duplicate fields. The CSPS can remedy or correct identified errors. In some cases, if the CSPS is unable to correct or remedy an issue identified during the error check process, the CSPS can request from the remote transaction processing server a new data structure or corrected data structure or to resend the data structure.

At 306, the CSPS can separate a list of entries in the data structure and identify a threshold. The CSPS can separate the entries in the data structure subsequent to the error check process. The CSPS can separate the entries based on a type identifier associated with or assigned to each of the entries. For example, the CSPS can separate entries that are assigned a first type identifier into a first list of entries, and separate entries that are assigned a second type identifier into a second list of entries. In some cases, the CSPS may identify a type identifier for an entry, in which case the CSPS may remove or filter out the entries without a type identifier, or otherwise not include the entry for further downstream processing.

At 308, the CSPS can determine a delta value. The CSPS can retrieve, from a parameter repository or other database storing thresholds, a threshold to use for the first and second set of entries based on the respective first and second type identifiers. The CSPS can perform a lookup in a database using the type identifier to retrieve the thresholds.

At 310, the CSPS can select a script. To select a script, the CSPS can compare the threshold value with a value in a set or list of entries. If the comparison between the threshold and the value of the set of entries results in a positive delta value, then the CSPS can select a first script. If the comparison between the threshold value and the set of entries results in a negative delta value, then the CSPS can select a second script. The CSPS can select the script from a repository or database. The CSPS can perform a lookup using one or more parameters, such as type identifier and positive or negative delta value to retrieve the script.

At 312, the CSPS can determine an output using the script. The CSPS can determine a first output by executing a first script on the first set of entries. The CSPS can determine a second output by executing a second script on the second set of entries. The CSPS can execute the scripts in parallel, in an overlapping manner, or serially.

At 314, the CSPS can provide a modified data structure. The CSPS can combine the first and second outputs into a modified data structure that replaces one or more entries in the data structure.

C. Dynamic-State-Driven Centralized Processing

Systems and methods of the present solution are directed to dynamic-state-driven centralized processing. A centralized state processing system can process electronic transactions on behalf of multiple entities. Each of those entities may have separate resources used to process electronic transactions associated with child entities. Thus, the centralized state processing system may be processing transactions for multiple entities as well as child entities that can be configured in a hierarchical tier structure.

The systems and methods of the present solution are directed to the technical problems and challenges of processing disparate electronic transactions. The systems and methods of the present solution are directed to the improvement of the performance and operation of the electronic transaction based technology and platform and computing and networking resource used by such electronic transaction based technology and platform. In some aspects, the present solution improves and enhances the implemented functionality of the electronic transaction based technology and platform implemented on, integrated with and inherently tied to the processor, memory, network and computing resources of one or more computing devices. In some aspects, the present solution more effectively performs the functionality of the electronic transaction based technology and platform thereby making and causing more effective use of the computing and networking resources to achieve the improved functionality of the present solution. The same computing and network resources used by such electronic transaction based technology and platform will provide increased and improved functionality with implementation of the present solution.

In some aspects, systems and methods of the present solution are dynamic-state-driven centralized processing. A centralized state processing system can process electronic transactions on behalf of multiple entities. Each of those entities may have separate resources used to process electronic transactions associated with child entities. Thus, the centralized state processing system may be processing transactions for multiple entities as well as child entities that can be configured in a hierarchical tier structure. However, it may be challenging to accurately, reliably and efficiently process these electronic transactions when the available resources may be insufficient or unavailable. Thus, systems and methods of the present technical solution are directed to centrally processing electronic transactions in a manner that manages remote procedure calls.

For example, the present solution can provide a centralized state processing system configured with a communications interface, validator, script selector, combiner and state manager. The centralized state processing system can intelligently select different processing scripts for even a single electronic transaction in order process the electronic transaction. Thus, instead of a single electronic transactions being forwarded to multiple processing servers or initiating multiple database queries or server requests, the centralized processing system can identify each of the different components of the electronic transaction up-front, select the corresponding or matching script, and then apply the processing script. In some cases, the centralized processing system can apply a parallel processing technique in order to execute multiple scripts for various components of the same electronic transaction.

In an illustrative example, an insurance carrier can have an insurance claim with multiple components or entries (e.g., charge for bed, charge for MRI, charge for procedures, etc.). All the services provided can be part of one bill, but each service can be listed out as an individual line item or entry, and each one may have a different coverage rate, etc. Thus, from an insurance standpoint, the insurer may be paying a different amount for prescription drugs versus other expenses incurred. The CSPS of the present technical solution can separate out the multiple charges and process them using different scripts, and then combine them together as a single expense. Thus, the present technical solution can process a single hospital visit with multiple line items. The CSPS can align with an insurance carrier claim (e.g., a remote transaction processing server or third-party administrator device) to store multiple expenses and process them into one overall claim. The CSPS can track the level of detail in the system. For example, if the insurance carrier adjusts a first line item, the CSPS can track each line item and account for each individual adjustments. While the individual entries or line items may be grouped into a single visit, the CSPS can execute different scripts to process them independently and differently.

Furthermore, by executing different scripts to process the entries differently, the CSPS provide an updated status each time a user logs into their digital portal. As adjustments are made on the remote transaction processing server (e.g., insurance carrier), then the CSPS can update the digital portal to display information at the appropriate level to the member (e.g., end user or insured). The digital portal can display a status of an overall visit, a single record or entry, or a claim for the overall visit. For example, for a single visit to a hospital, the digital portal can enter into each claim and display each line item, including, for example, how much insurance paid and what end user is responsible for. The CSPS can align with insurance carrier to support adjustments and also take that additional information and display it in an easy to understand manner for the end user. To do so, the CSPS can provide a state manager with increased granularity that can be configured to reconcile states.

Figure 4:
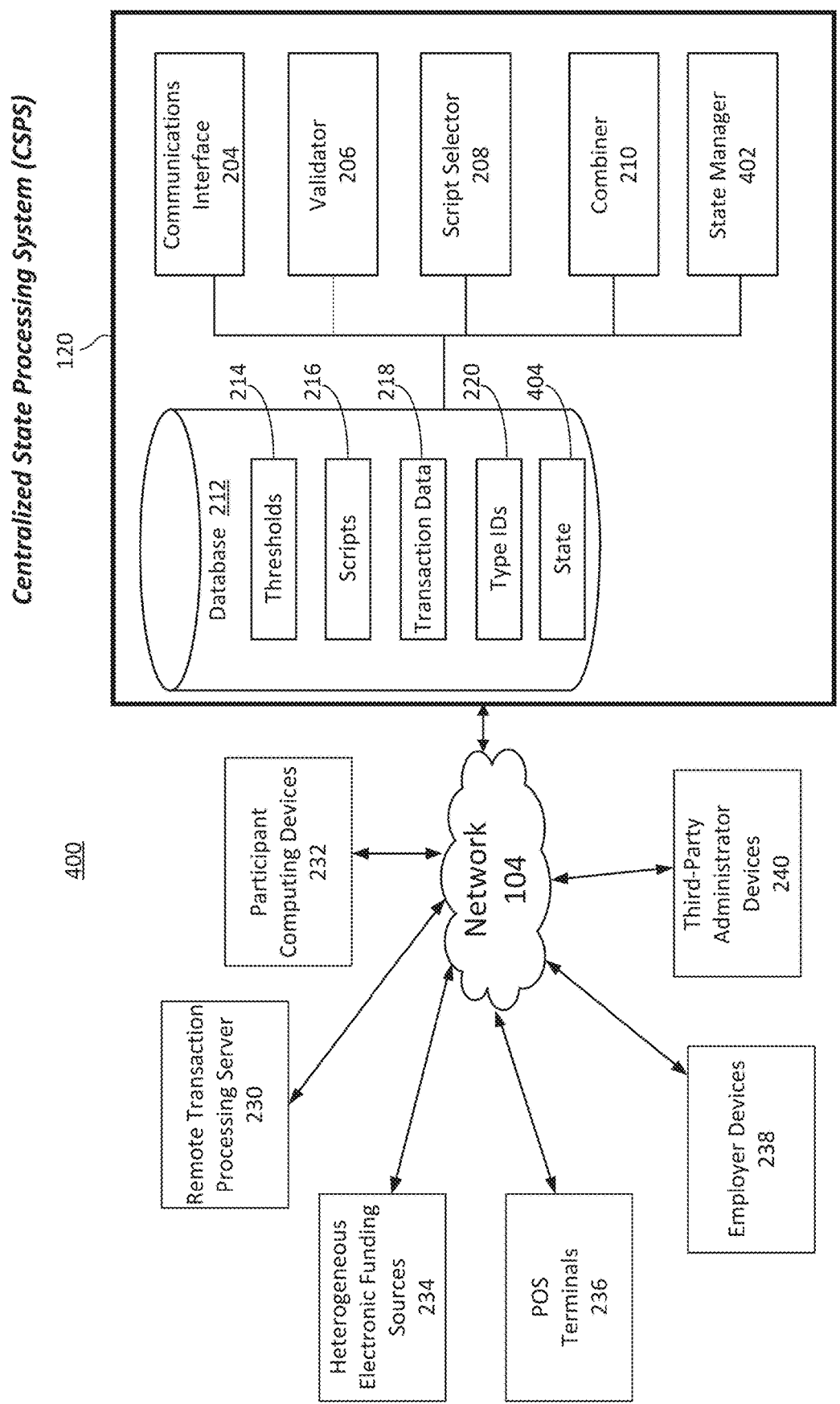
FIG. 4 is a block diagram depicting an embodiment of a system for dynamic-state-driven centralized processing.

Referring now to FIG. 4, a block diagram depicting an embodiment of a system 400 comprising a centralized state processing system is shown. The system 400 can include one or more component or functionality of system 200 depicted in FIG. 2. The CSPS 120 can include a communications interface 204 that is configured with one or more communications ports, application programming interfaces, network protocols (e.g., TCP/IP), authentication protocols, or security protocols (e.g., SSL). The communications interface 204 can receive a data structure constructed by a remote transaction processing server based on processing a plurality of electronic transactions that occurred within a spatiotemporal area. The data structure can include a plurality of entries that each have a type identifier. The CSPS 120 can include, interface with, or otherwise access a validator 206 that performs an error checking process on the entries in an electronic transaction. The CSPS 120 can include, interface with, or otherwise access a script selector 208 that parses the entries based on a type identifier to identify a first entry having a first type identifier and a second entry having a second type identifier. The script selector 208 can identify, using a parameter repository (e.g., database 212) storing a plurality of thresholds (e.g., thresholds 214), a first threshold for the first entry based on the first type identifier, and a second threshold for the second entry based on the second type identifier. The script selector 208 can determine, based on a comparison between the first threshold and a first value of the first entry, a positive delta value. The script selector 208 can determine, based on a comparison between the second threshold and a second value of the second entry, a negative delta value. The script selector 208 can select, from a script repository (e.g., scripts 216), a first script to apply to the first entry based on the positive delta value and the first type identifier, and a second script to apply to the second entry based on the negative delta value and the second type identifier. The CSPS 120 can include, interface with, or otherwise access a combiner 210 that can determine a first output for the first entry using the first script, and a second output for the second entry using the second script.

Further, the CSPS 120 can include, interface with, or otherwise access a state manager 210 that can map outputs to states. The database 212 can include a state data structure comprising state information or predetermined states or storing states for entries or data structures. The state manager 402 can include one or more processing units or other logic devices such as programmable logic array engines, modules, or circuitry designed and constructed to facilitate managing security on a network infrastructure.

The state manager 402 can map the first output to a first state of a plurality of states a distributed heterogeneous electronic transaction process. The state manager 402 can map the second output to a second state of the plurality of states the distributed heterogeneous electronic transaction process. The state manager 402 can determine a combined state based on the first state and the second state. The state manager 402 can provide an indication of at least one of the combined state, the first state, or the second state. The state manager 402 can provide the indication responsive to a request from a client device received via a computer network. The state manager 402 can provide the indication via a hierarchical graphical tree structure.

For example, the states 404 can refer to or include partially authorized, partially transacted, applied to portion, reversed, or over-transacted. The state manager 402 can assign or determine one of the states 404 to the output. The state manager 402 can provide a modified single data structure with the first output, the second output, the first state, the second state, and the combined state. The modified single data structure can replace one or more of the plurality of entries of the data structure.

To determine the state, the state manager 402 can map outputs to states such as submitted no receipt, eligible for reimbursement, submitted, paid, approved or denied. The state manager 402 can further map outputs to states such as partially approved, partially paid, applied to deductible, reversed or overpaid.

The state manager 402 can determine the state is approved if all claim lines are fully approved or fully offset. The state manager 402 can determine the state is approved if all lines are not yet reimbursed if reimbursement method is not set to external. The state manager 402 can determine the state is paid if all claim lines are all external or reimbursed (e.g., Check/Direct Deposit # assigned).

The state manager 402 can determine the state is Eligible for Reimbursement if there is a remaining member responsibility on at least one claim line and the participant has an account that would pay this amount. To determine if there is an account that would pay the remaining amount, the state manager 402 can determine if the account meets the following criteria:
  The Service date falls within the account's effective dates
    Is date of service>=to all of the following:
      Plan Start Date
      Employee eligibility date
      Employee account effective date
    IF dependent claim:
      Dependent eligibility Date
      Dependent Account effective date
    AND is date of service<=to the following
      Grace period date or if no grace period date, then
        Plan End Date
      Employee termination date
      Employee account termination date
      If claim is for dependent:
        Dependent termination date
        Dependent account effective Date
  The account includes an SCC and any of the Member Liability amounts have direct submit enabled.

The state manager 402 can determine a partially approved state if the member has remaining responsibility for at least one claim line but there are no other accounts available to pay the claim lines. The state manager 402 can determine a partially paid state if the member has remaining responsibility for at least one claim line but there are no other accounts available to pay the claim lines, and the reimbursement method is external or Check/DD has been reimbursed. The state manager 402 can determine an applied to Deductible state if all claim lines have been applied to the DTR or Deductible Rules and nothing has been approved. The state manager 402 can determine a denied state if none of the previous states map to an output.

Thus, the present technical solution can provide an improved system 400 or improve the functioning of system 400 itself using software, hardware or a combination thereof. The system 400 can more efficiently interface with remote systems, as well reduce the number of interactions between remote systems by more efficiently processing electronic transactions.

Figure 5:
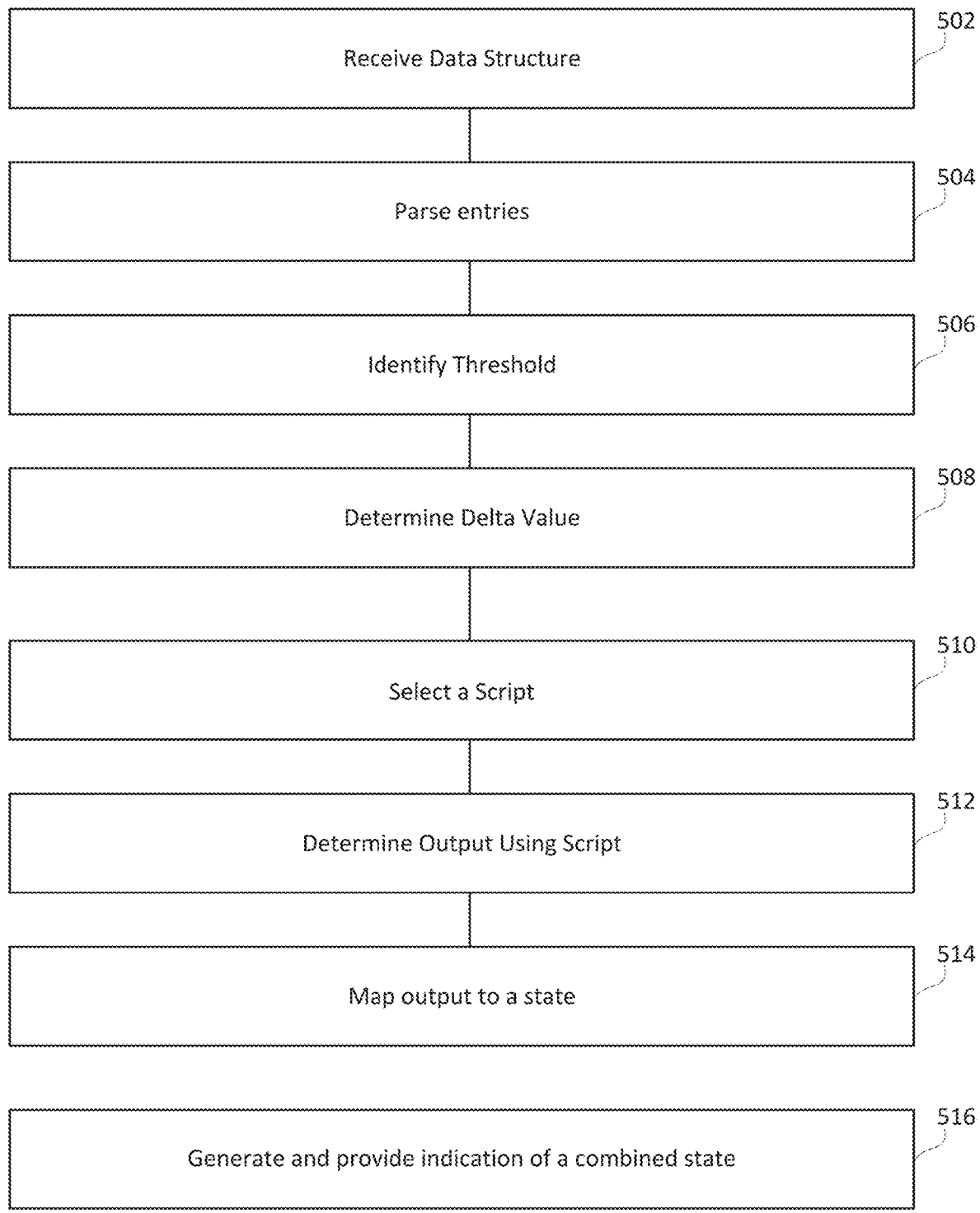
FIG. 5 is a flow diagram depicting an embodiment of a method of dynamic-state-driven centralized processing.

Referring now to FIG. 5, a method of dynamic-state-driven centralized processing in accordance with an embodiment is provided. The method 500 can be performed using one or more system or component depicted in FIGS. 1A-1D, FIG. 2, or FIG. 4, including, for example, a centralized state processing system, communications interface, validator, script selector, combiner and state manager. In brief overview, the method 500 can include a centralized state processing system ("CSPS") receiving a data structure at step 502. At step 504, the CSPS can parse entries. At step 506, the CSPS can identify a threshold. At step 508, the CSPS can determine delta values. At step 510, the CSPS can select a script. At step 512, the CSPS can determine output using the selected script. At step 514, the CSPS can map the output to a state. At step 516, the CSPS can generate and provide an indication of a combined state.

Still referring to FIG. 5, and in further detail, the method 500 can include the CSPS receiving a data structure at step 502. The data structure can carry multiple electronic transactions. The CSPS can receive the data structure via a network. The CSPS can retrieve the data structure from a database. The CSPS can receive the data structure in real-time, or a bulk upload or batch process. For example, the CSPS can receive data packets comprising the data structure during a batch process that occurs on a periodic basis, such as every 24 hours, 12 hours, 36 hours or some other time interval. The CSPS can receive the data packets responsive to a trigger condition or event, such as a request from an administrator of the CSPS, alarm condition, notification, etc. The data structure can be constructed by a remote transaction processing server based on processing a plurality of electronic transactions that occurred within a spatiotemporal area. The data structure can include a plurality of entries that each have a type identifier.

At 504, the CSPS can parse the entries based on a type identifier to identify a first entry having a first type identifier and a second entry having a second type identifier. The CSPS can separate a list of entries in the data structure and identify a threshold. The CSPS can separate the entries in the data structure subsequent to the error check process. The CSPS can separate the entries based on a type identifier associated with or assigned to each of the entries. For example, the CSPS can separate entries that are assigned a first type identifier into a first list of entries, and separate entries that are assigned a second type identifier into a second list of entries. In some cases, the CSPS may identify a type identifier for an entry, in which case the CSPS may remove or filter out the entries without a type identifier, or otherwise not include the entry for further downstream processing.

At 506, the CSPS can identify a threshold. The CSPS can retrieve, from a parameter repository or other database storing thresholds, a threshold to use for the first and second set of entries based on the respective first and second type identifiers. The CSPS can perform a lookup in a database using the type identifier to retrieve the thresholds.

At 508, the CSPS can determine a delta value. The CSPS can determine, based on a comparison between the first threshold and a first value of the first entry, a positive delta value. The CSPS can determine, based on a comparison between the second threshold and a second value of the second entry, a negative delta value.

At 510, the CSPS can select a script. To select a script, the CSPS can compare the threshold value with a value in a set or list of entries. If the comparison between the threshold and the value of the set of entries results in a positive delta value, then the CSPS can select a first script. If the comparison between the threshold value and the set of entries results in a negative delta value, then the CSPS can select a second script. The CSPS can select the script from a repository or database. The CSPS can perform a lookup using one or more parameters, such as type identifier and positive or negative delta value to retrieve the script.

At 512, the CSPS can determine an output using the script. The CSPS can determine a first output by executing a first script on the first set of entries. The CSPS can determine a second output by executing a second script on the second set of entries. The CSPS can execute the scripts in parallel, in an overlapping manner, or serially.

At 514, the CSPS can generate and provide an indication of a combined state. The CSPS can map the output values to a state. For example, the CSPS can map the first output to a first state, and map the second output to a second state. The CSPS can determine a combined state based on the first and second states. The CSPS can provide the indication of the state as at least one of a combined state, the first state or the second state. The CSPS can provide the indication via a hierarchical graphical tree structure. For example, the hierarchical graphical tree structure can refer to the different entries or components in a claim and allow a user to drill down into their claim and each component thereof.

Referring now to FIGS. 6-10, flow charts for managing remote procedures calls and performing dynamic state-driven centralized processing in accordance with embodiments are provided. The flows 600, 700, 800, 900 and 100 depicted in FIGS. 6-10 can be performed using one or more system or component depicted in FIGS. 1A-1D, FIG. 2, or FIG. 4, including, for example, a centralized state processing system 120, communications interface 204, validator 206, script selector 208, combiner 210 and state manager 402.

Figure 6A:
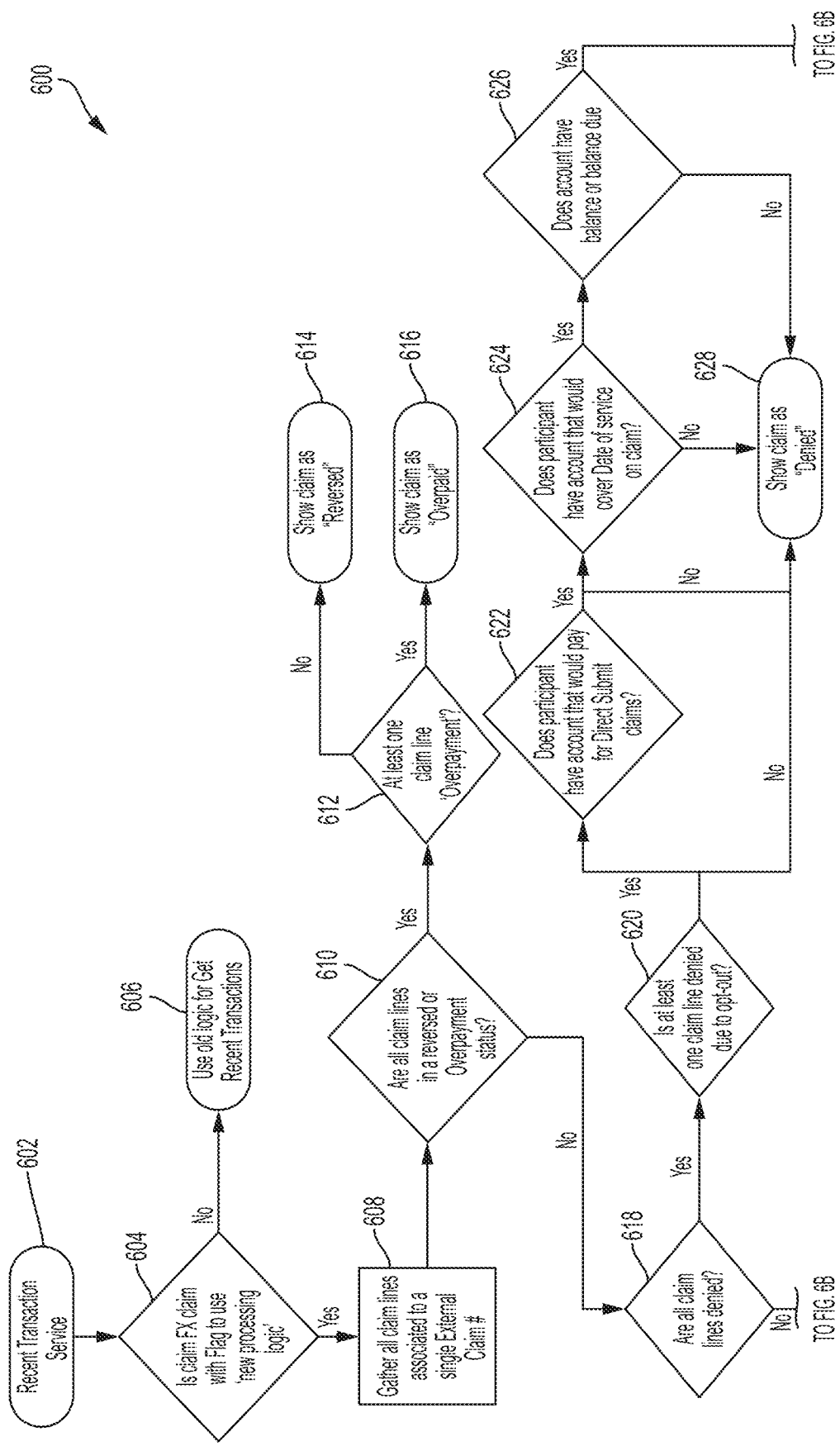
FIGS. 6A, 6B, and 6C depicts flow diagrams for managing remote procedure calls and dynamic-state-driven centralized processing, in accordance with some embodiments.
Figure 6B:
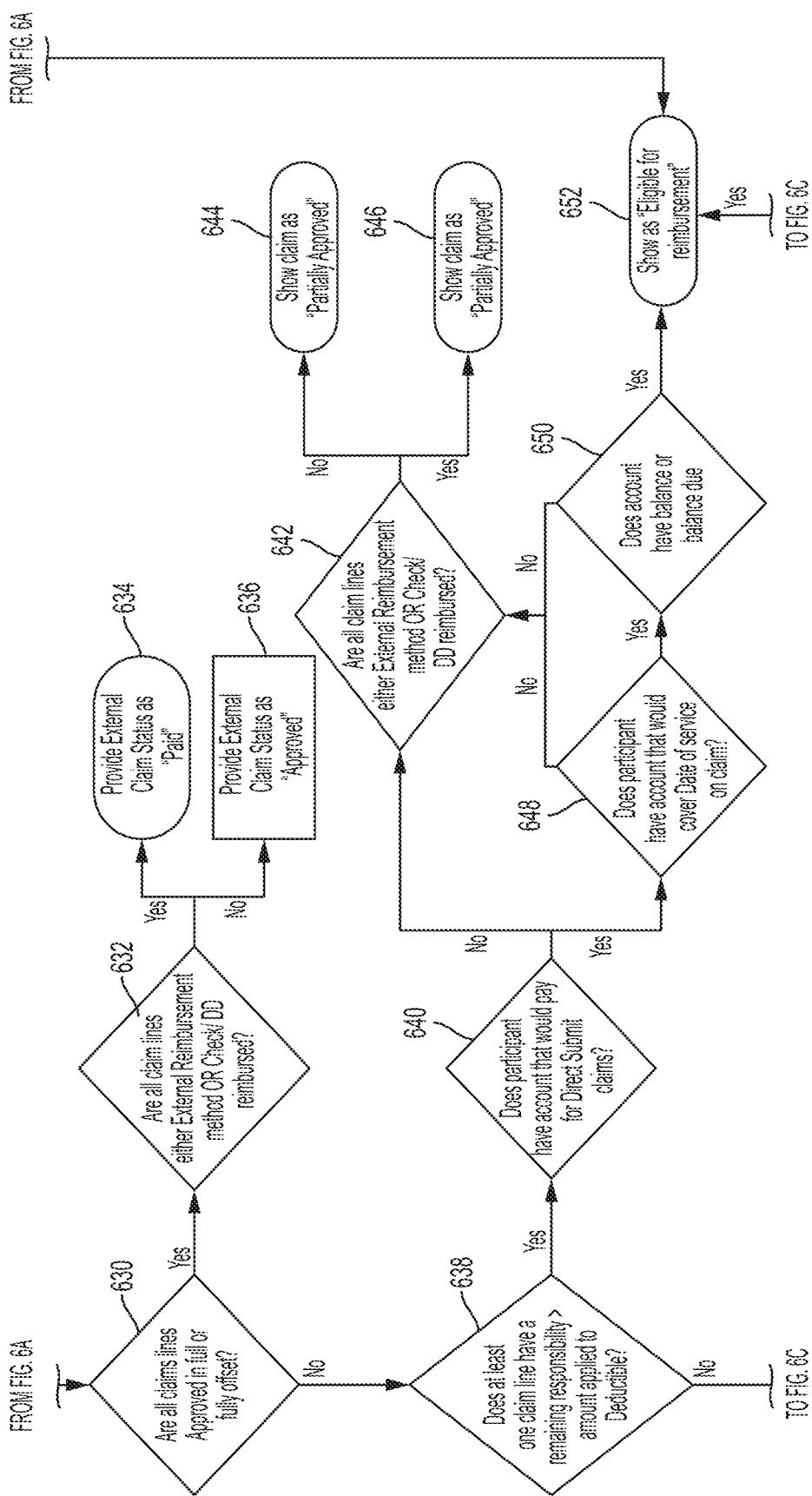
Figure 6C:
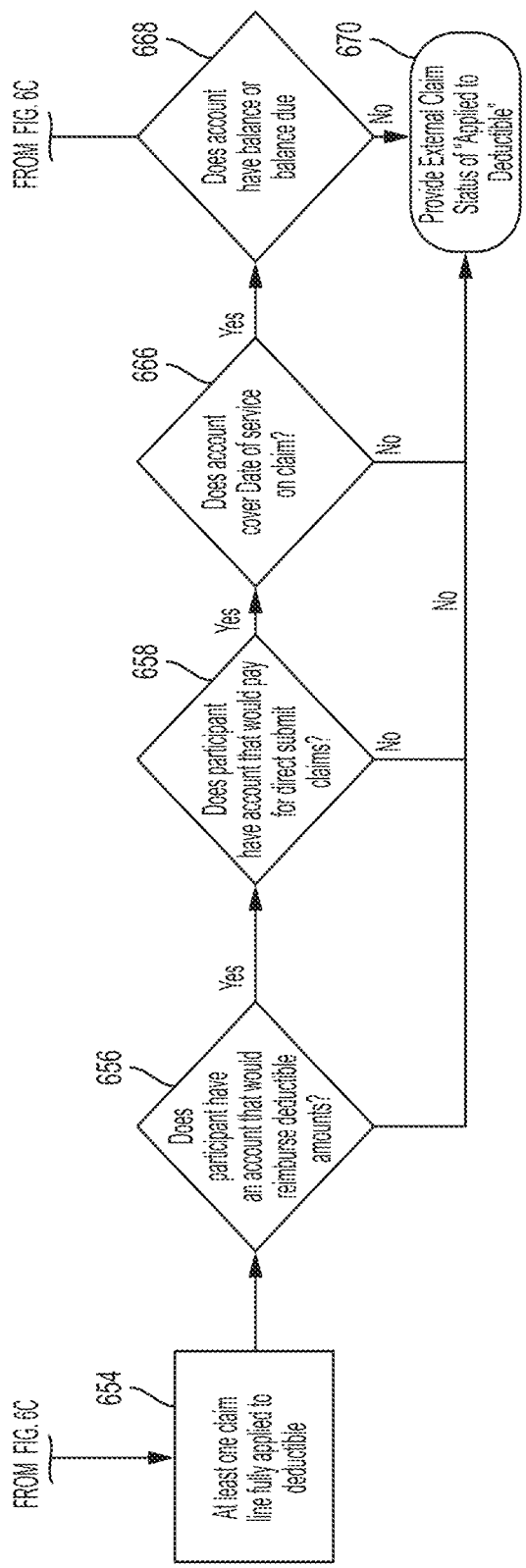

FIGS. 6A-6C depict a flow 600 for performing dynamic state-driven centralized processing. At 602, the CSPS can perform a recent transaction service. The CSPS can receive a data structure with one or more entries. At 604, the CSPS can determine whether the claim is flagged for the dynamic-state-driven processing logic. If the claim is not flagged for the dynamic-state-driven processing logic, then the CSPS can proceed with old processing logic at step 606. If the claim is flagged for the new dynamic-state-driven processing logic, then the CSPS can proceed to step 608 and gather all the entries in the claim (e.g., all claim lines) that are associated with a single external claim number. The CSPS can then proceed to step 610 and determine if the claims lines are in a reversed or overpayment status. If the claim lines are in a reversed or overpayment status, as determined at 610, the CSPS can then proceed to step 612 and determine whether at least one claim line is an overpayment. If, at 612, the CSPS determines that no claim line is overpayment, then the CSPS proceeds to 614 and indicates that the claim has been reversed. If, at 612, the CSPS determines that at least one claim line is in overpayment, then the CSPS can show the claim as being overpaid at 616.

At 610, if the CSPS determiners that one of the claim lines are not in a reversed or overpayment status, then the CSPS proceeds to 618 and determines whether all claim lines are denied. If, at 618, the CSPS determines that all claim lines are denied, the CSPS can proceed to 620 to determine if at least one claim line was denied due to an opt-out. If, at 620, the CSPS determines that a claim line was denied due to an opt-out, then the CSPS can proceed to determine, at 622, whether the participant has an account that would pay for direct submit claims. If the CSPS determines, at 622, that the participant has an account that would pay for direct submit claims, the CSPS can proceed to 624 to determine whether the participant has an account that would cover the date of service on the claim. If the CSPS determines the participant has an account that would cover the date of service on the claim, at 624, then the CSPS can proceed to 626 to determine if the account has a balance or a balance due.

If, at 626, the CSPS determines that the account does not have a balance or a balance due, then the CSPS can show the claim as denied at 628. This can be the mapped state for the claim. Similarly, if at 624, the CSPS determines the participant does not have an account that would cover the date of service on the claim, then the CSPS can proceed to 628 and show claim as denied. Similarly, if at 622, the CSPS determines the participant does not have an account that pays for direct submits claims, then the CSPS can proceed to 628 and show the claim as denied.

If, at 618, the CSPS determines that not all the claims are denied, then the CSPS can proceed to 630 (depicted in FIG. 6B) and determine whether all claim lines are approved in full or fully offset. If, at 630, the CSPS determines that all the claim lines are approved in full or offset, the CSPS can proceed to 632 and determine whether all claim lines are either external reimbursement method or check/DD reimbursed. If, at 632, the CSPS determines the output of decision block 632 is yes, then CSPS proceeds to 634 and provides an external claims status (or state) as paid. If, at 632, the CSPS determines the output of decision block 632 is no, then CSPS proceeds to 636 and provides an external claims status (or state) as approved.

If, at 630, the CSPS determines that not all claims lines are approved in full or fully offset, the CSPS proceeds to 638. At 638, the CSPS determines whether at least one claim line has a remaining responsibility that is greater than an amount applied to deductible. If the output of decision block 638 is Yes, then the CSPS proceeds to 640 at which the CSPS determines whether the participant has an account that would pay for direct submit claims. If the CSPS determines at 640 that the participant has an account that pays for direct submits claims, the CSPS proceeds to 648 and determines whether the participant has an account that would cover the date of service on the claim. If the output of 648 is Yes, the CSPS can proceed to 650 to determine whether the account has a balance or balance due. If the output of 650 is yes, the CSPS proceeds to 652 to show that the status or state is eligible for reimbursement. Similarly, if the CSPS determines at 626 that the account has a balance or a balance due, the CSPS proceeds to 652 and shows the state as eligible for reimbursement.

If the output of block 640, block 648 or block 650 is no, then the CSPS proceeds to 642. At 642, the CSPS determines whether all claim lines are either external reimbursement method or check/DD reimbursed. If the output of block 642 is no, then the CSPS shows the claim state as partially approved. If the output of 642 is yes, then the CSPS shows the claim state as partially approved.

If, at 638, the CSPS determines the output is no, then the CSPS proceeds to 654 to determine that at least one claim line is fully applied deductible. The CSPS then proceeds to 656 to determine whether the participant has an account that would reimburse the deductible amounts. If the output of 656 is yes, then the CSPS proceeds to 658 to determine whether the participant has an account that would pay for direct submit claims. If the output of 658 is yes, then the CSPS proceeds to 666 and determines whether the account covers the date of service on the claim. if the output of 666 is yes, then the CSPS proceeds to 668 to determine whether the account has a balance or a balance due. If at 668 the CSPS determines the account does have a balance or balance due, the CSPS proceeds to 652 and determines the state as eligible for reimbursement. If, however, at 656, 658, 666 or 668 the CSPS determines the output is no, then the CSPS proceeds to 670 and determines the state is applied to deductible and provides the corresponding external claim status.

Figure 7A:
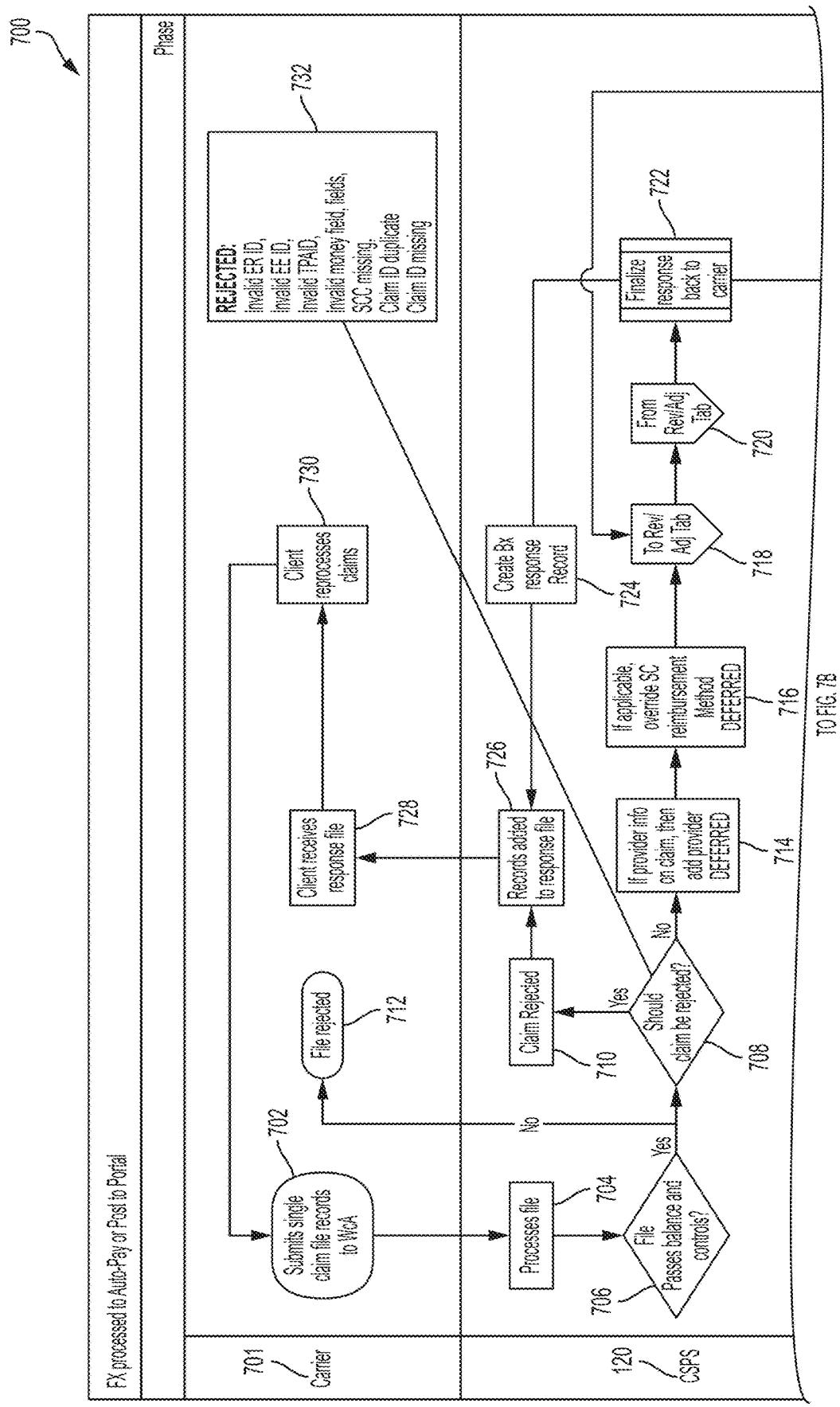
FIGS. 7A-7B depicts flow diagrams for managing remote procedure calls and dynamic-state-driven centralized processing, in accordance with some embodiments.
Figure 7B:
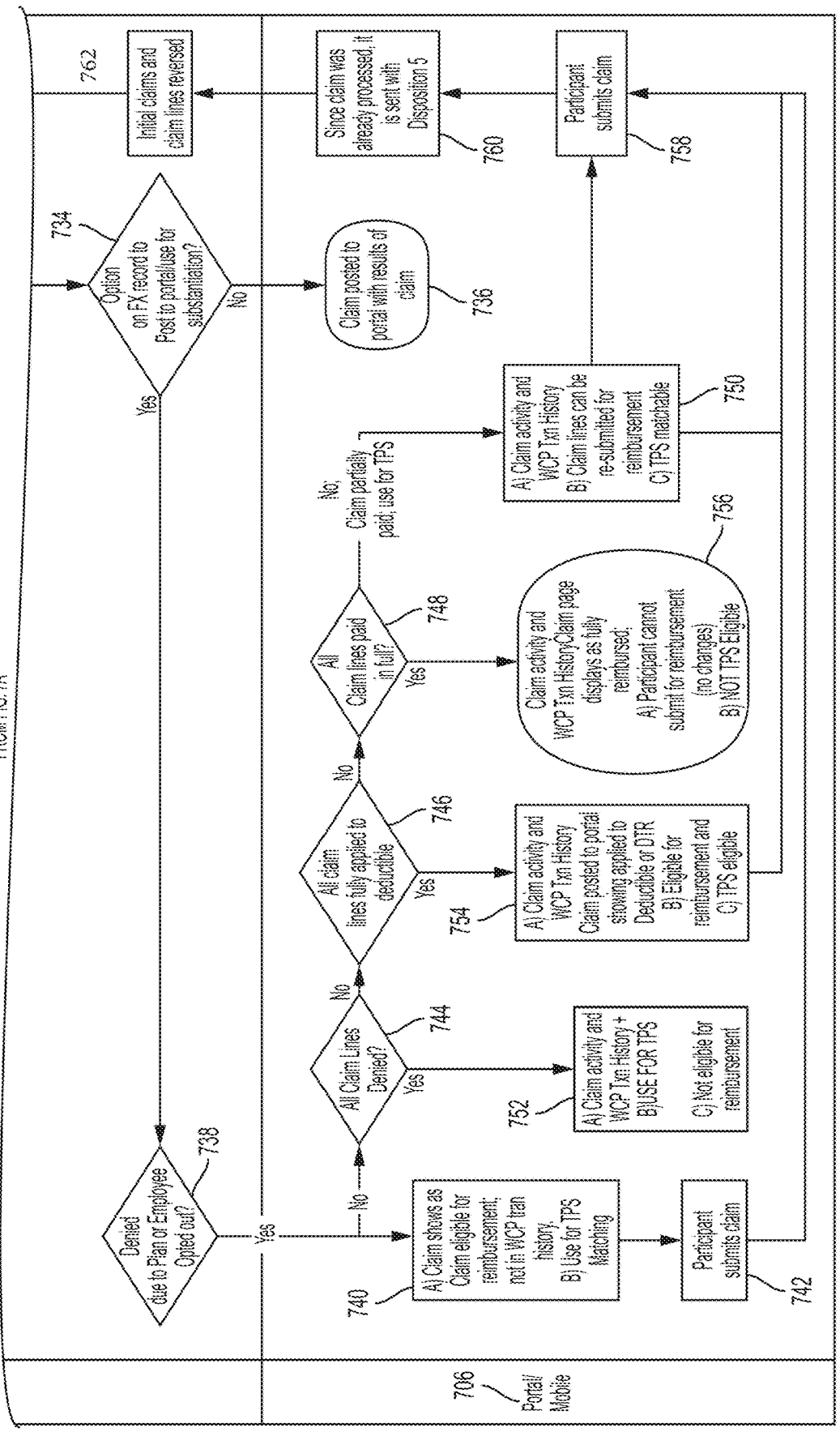

FIGS. 7A-7B depict a process 700 for auto-pay or post to portal. Aspects of 700 correspond to an insurance carrier 701, while other aspects correspond to the CSPS 120 (e.g., CSPS 120). At 702, the carrier 701 can submit a single claim file record to the CSPS 120. At 704, the CSPS 120 can process the file. At 706, the CSPS 120 determines whether the file passes balance and controls (e.g., an error check or validation process). If the CSPS 120 determines at 706 that the file does not passes an initial error check or validation, the CSPS 120 can indicate to the insurance carrier 701 that the file is rejected at 712.

If the CSPS 120 determines the output of 706 is yes, then the CSPS 120 proceeds to 708 and determines whether the claim should be rejected. The CSPS 120 can determine to reject the claim for one or more of the following reasons 732: invalid ER ID, invalid EE ID, invalid TPAID, invalid money field or fields, SCC missing, claim ID duplicate, or claim ID is missing. If, at 708, the CSPS 120 determines the claim should be rejected, the CSPS proceeds to 710 and flags the claim as rejected, and then proceeds to 726 to add the record to a response file, and sends the response file to the insurance carrier 701. The insurance carrier 701 can receive the response file at 728, and then proceed to reprocess the claims at 730.

If the CSPS 120 determines at 708 not to reject the file or claim, the CSPS 120 proceeds to 714 at which the CSPS can determine whether or not to add the provider information to the claim or defer this step if the provider info is already on the claim. The CSPS 120 can then proceed to 716 and apply an override SC reimbursement method if applicable, or defer such application. The CSPS 120 can then proceed to 718 and send the information to review or adjudication tab. The CSPS 120 can then receive from the review adjudication tab 720 input, and finalize the response at 722 and send it to the carrier 701 by creating a bulk response record at 724 that is then added to the response file at 726.

At 722, the CSPS 120 finalized the response and can proceed to decision block 734 depicted in FIG. 7B. At decision block 734, the CSPS 120 can determine whether the electronic transaction has the option to post the record to the portal or use the record for substantiation. If the output of 734 is yes, then the CSPS proceeds to 738. At 738, the CSPS determines whether the claim is denied due to whether the plan or employee opted out. If the CSPS 120 determines that the output of 738 is yes, the CSPS 120 can display, via the digital portal or a mobile device, information at block 740 including showing the claim as eligible for reimbursement, but not in the CSPS transaction history, but use it for state matching. At 742, the participant can submit the claim through the digital portal or mobile device, which can be proceed to block 758. At block 760, the digital portal can determine that since the claim was already processed, to send it with a predetermine disposition indicator.

If, however, at 738 the CSPS 120 determines the output is no, the CSPS 120 can determine at 744 whether all claim lines are denied. If the output of 744 is yes, the CSPS 120 can display, via the digital portal or a mobile device, that the claim activity and the CSPS transaction history can be used for transaction processing and that the claim is not eligible for reimbursement. If the output of 744 is no, the CSPS 120 proceeds to determine whether all the claim lines are fully applied to the deductible at 746. If the output of 746 is yes, then, at 754, the digital portal displays A) claim activity and transaction history claim posted to portal showing applied to deductible or DTR; B) eligible for reimbursement, and C) TPS eligible.

If the output of 746 is no, the CSPS 120 can proceed to 748 and determine whether all claim lines are paid in full. If the output of 748 is yes, the CSPS can proceed to display the claim activity and transaction history claim page as fully reimbursed; the participant cannot submit for reimbursement (e.g., no changes allowed), and the claim is not TPS eligible.

If the output of 748 is no, then the CSPS 120 determines that the claim is partially paid and can use it for TPS. The CSPS 120 can proceed to show the claim activity and transaction history page where the claim lines can be re-submitted for reimbursement and indicate that it is TPS matchable. The CSPs can then proceed to 758, which proceeds to 760 and then proceeds to 762 where the initial claims and claim lines are reversed. The CSPS 120 can then proceed to show the review/adjudication tab 718.

Figure 8A:
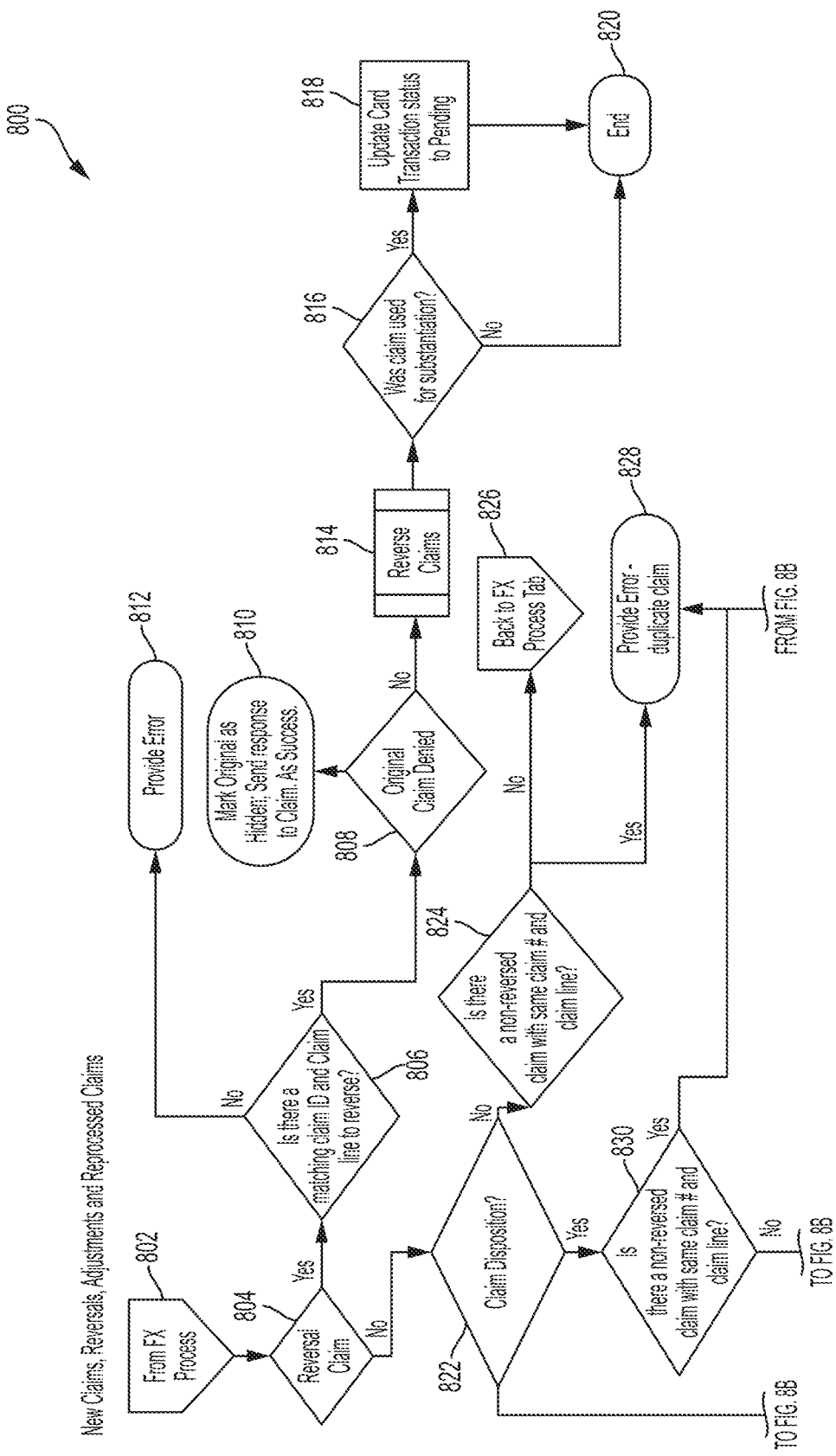
FIGS. 8A-8B depicts flow diagrams for managing remote procedure calls and dynamic-state-driven centralized processing, in accordance with some embodiments.
Figure 8B:
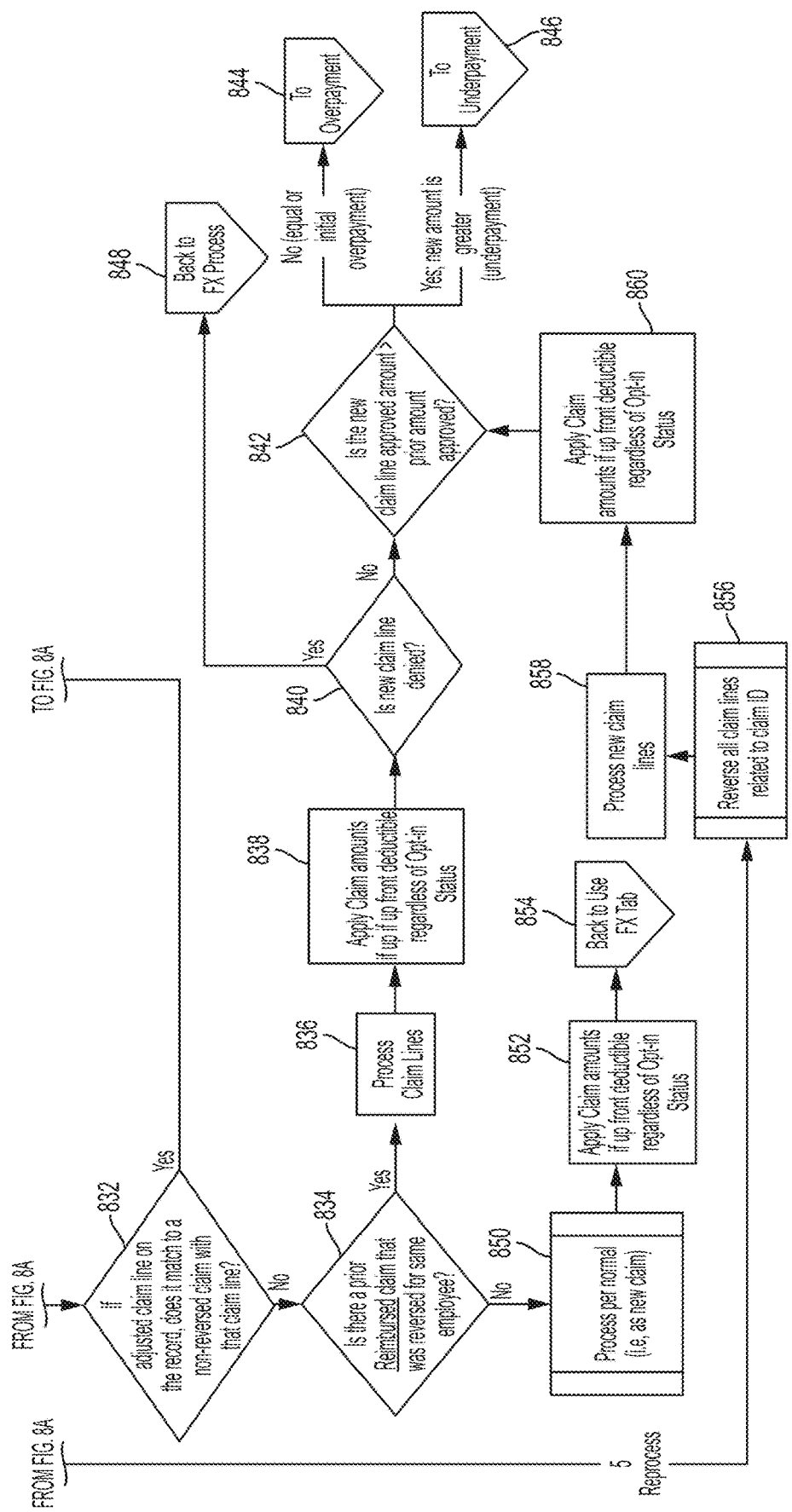

FIGS. 8A-8B depict a flow 800 for new claims, reversals, adjustments and reprocessed claims. At 802, the CSPS 120 can receive an electronic transaction or claim. At 804, the CSPS 120 determines whether to perform a claim reversal. If yes, the CSPS proceeds to 806 to determine if there is a matching claim ID and claim line to reverse. If the output of 806 is no, the CSPS 120 provides an error indication at 812. If the output of 806 is yes, the CSPS 120 proceeds to 808 and determines whether the original claim is denied. If the original claim is denied at 808, the CSPS 120 proceeds to 810 and marks the original as hidden and sends a response to the claim as a success. If the original claim is not denied at 808, the CSPS proceeds to 814 and reverses the claims. The CSPS 120 then proceeds to 816 to determine whether the claim was used for substantiation. If the output of 816 is yes, the CSPS 120 proceeds to update the card transaction status to pending at 818, and then ends, terminates or exits the flow at 820. If the output of 816 is no, the CSPS 120 then ends, terminates or exits the flow at 820.

If, at 804, the reverse claim output is no, the CSPS proceeds to 822 to determine a claim disposition. If the claim disposition at 822 is no, then the CSPS proceeds to 824 to determine whether there is a non-reversed claim with the claim number and claim line. If the output of 824 is no, then the CSPS proceeds to 826 and back to the process tab.

If the output of 824 is yes, then the CSPS 120 proceeds to 828 and provides and error as a duplicate claim.

If the output of 822 is yes, then the CSPS proceeds to 830 to determine whether there is a non-reversed claim with the claim number and claim line. If the output of 830 is yes, then the CSPS 120 proceeds to 828 and provides a duplicate claim error. If the output of 830 is no, then the CSPS 120 proceeds to 832 in FIG. 8B.

At 832, the CSPS determines if the adjusted claim line on the record matches to a non-reversed claim with that claim line. If the output of 832 is yes, then the CSPS 120 proceeds to 828 and provides an error. If the output of 832 is no, then the CSPS proceeds to 834 and determines whether there is a prior reimbursed claim that was reversed for the same employee. If the output of 834 is yes, then the CSPS 120 proceeds to 836 and processes claim lines. The CSPS 120 can then proceed to 838 and apply claim amounts if up front deductible regardless of the opt-in status. The CSPS 120 can then proceed to 840 and determine whether the new claim line is denied. If the output of 840 is yes, then the CSPS 120 proceeds to go back to the transaction process at 848. If the output of 840 is no, then the CSPS proceeds to 842 to determine if the new claim line approved amount is greater than the prior amount approved. If, at 842, the CSPS 120 determines that the claim line approved amount is greater, then the CSPS 120 proceeds to 846 and flags the status as an underpayment. If, at 842, the CSPS 120 determines the claim line approved amount is equal to or less than the initial payment, then the CSPS 120 proceeds to 844 and flags the payment as an overpayment.

If the output at 834 is no, the CSPS 120 proceeds to 850 and processes per normal (e.g., as a new claim). The CSPS 120 then proceeds to 852 and applies claim amounts if up front deductible regardless of opt-in status. The CSPS 120 then proceeds to 854 and goes back to the use transaction tab.

If, at 822, the claim disposition indicates that there have been 5 reprocesses, the CSPS 120 proceeds to 856 and reverses all claim lines related to the claim ID. The CSPS then proceeds to 858 and process new claim lines. The CSPS 120 then proceeds to 860 and apply claim amounts if up front deductible regardless of opt-in status. The CSPS can then proceed to 842.

Figure 9A:
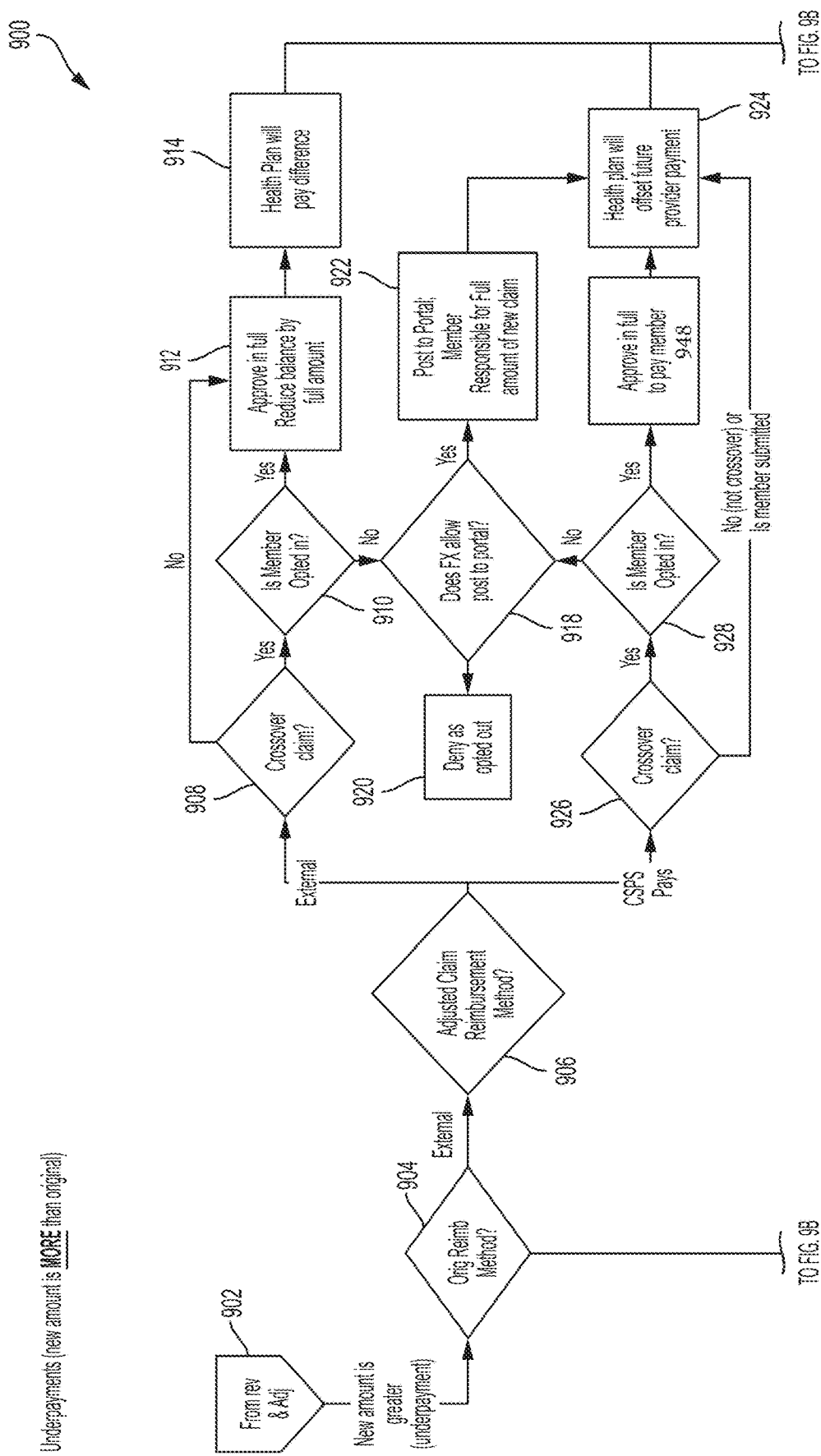
FIGS. 9A-9B depicts flow diagrams for managing remote procedure calls and dynamic-state-driven centralized processing, in accordance with some embodiments.
Figure 9B:
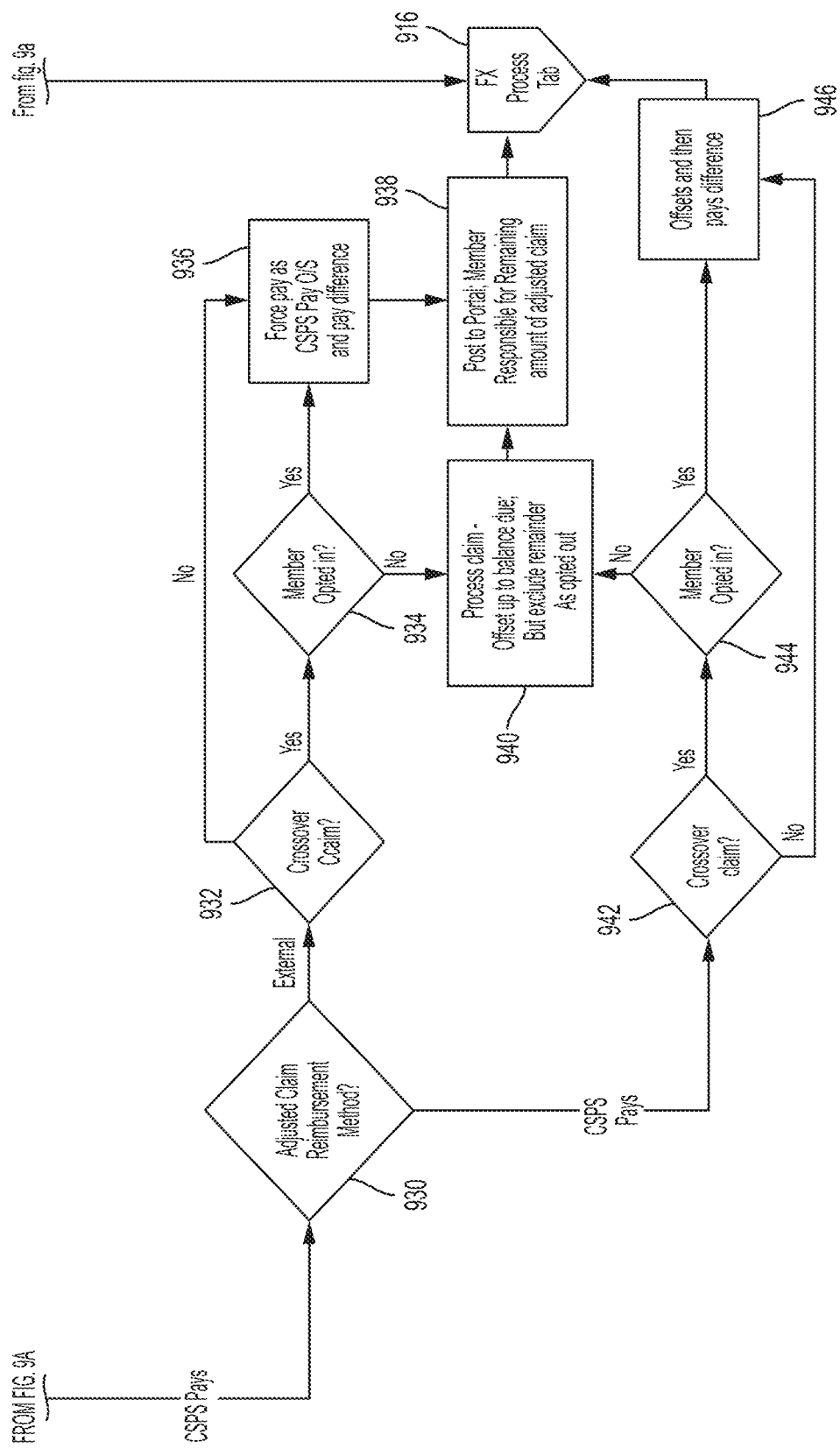

FIGS. 9A-9B depict an underpayments flow 900 performed by CSPS 120. At 902, the CSPS 120 receives a review and adjudication indicating that the new amount is greater (e.g., an underpayment). At 904, the CSPS 120 determines the original reimbursement method. If the original reimbursement method was external, then the CSPS 120 proceeds to 906 to determine the adjusted claim reimbursement method. If the adjusted claim reimbursement method was external, as determined by the CSPS 120 at block 906, then the CSPS 120 proceeds to 908 to determine whether the claim is a crossover claim. If the claim is a crossover claim, then the CSPS 120 determines whether the member opted in at block 910. If the member did opt in, the CSPS 120 proceeds to block 912 to approve in full reduce balance by full amount. If the CSPS 120 determines at 908 that the claim is not a crossover claim, the CSPS 120 proceeds to 912 directly. Subsequent to block 912, the CSPS 120 proceeds to block 914 to determine the health plan will pay the difference. The CSPS 120 then proceeds to 916 (depicted in FIG. 9B) to the transaction process tab.

If, at 910, the CSPS 120 determines the member did not opt in, the CSPS 120 proceeds to 918 to determine if the transaction allows post to portal. If the CSPS 120 determines that the transaction does allow post to portal, the CSPS 120 proceeds to 922 to post to portal and indicate the member is responsible for the full amount of the new claim. The CSPS 120 then proceeds to 924 where the health plan will offset future provider payment. If, at 918, the CSPS 120 determines the transaction does not allow post to portal, the CSPS 120 proceeds to 920 to deny due to opted out.

If, at 906, the CSPS 120 determines the reimbursement method is CSPS pays, then the CSPS 120 proceeds to 926 to determine whether the claim is a crossover claim. If, at 926, the CSPS 120 determines the claim is a crossover claim, the CSPS 120 proceeds to 928 to determine whether the member opted in. If the member did not opt in, then the CSPS proceeds to 918. If the member did opt in, then the CSPS proceeds to 948 to approve in full to pay the member. The CSPS 120 then proceeds to 924 to indicate the health plan will offset future provider payment. If, at 926, the CSPS 120 determines the claim is not a crossover claim, the CSPS 120 proceeds to 924.

If, at 904, the CSPS 120 determines that the original reimbursement method was CSPS pays, then the CSPS 120 then proceeds to 930 depicted in FIG. 9B, where the CSPS determines the adjusted claim reimbursement method. If the reimbursement method is external, then the CSPs 120 proceeds to 932. At 932, if the CSPS determines the claim is a crossover claim and then determines the member opted in at 934, the CSPS proceeds to 936 to force pay as CPS pays O/S and pay the difference and then to 938 to post to portal. If, at 932, the claim is not crossover, then the CSPS proceeds to 936. If, at 934, the member did not opt-in, then the CSPS proceeds to 940 to process the claim offset up to balance due, but exclude the remainder as opted out. The CSPS 120 then proceeds to 938 to post to portal. AT 938, the CSPS can post to portal an indication that the member is responsible for the remaining amount of the adjusted claim. The CSPs can then proceeds to 916.

If, at 930, the CSPS 120 determines that the CSPS pays, then the CSPS 120 proceeds to 942 to determine whether the claim is a crossover claim. If the claim is a crossover claim, the CSPS proceeds to 944 to determine whether the member opted in. If the member did not opt in, then the CSPS 120 proceeds to 940. If the member did opt in, or the claim is not a crossover claim, then the CSPS 120 proceeds to 946 to perform the offset and then pay the difference, and then proceed to 916.

Figure 10:
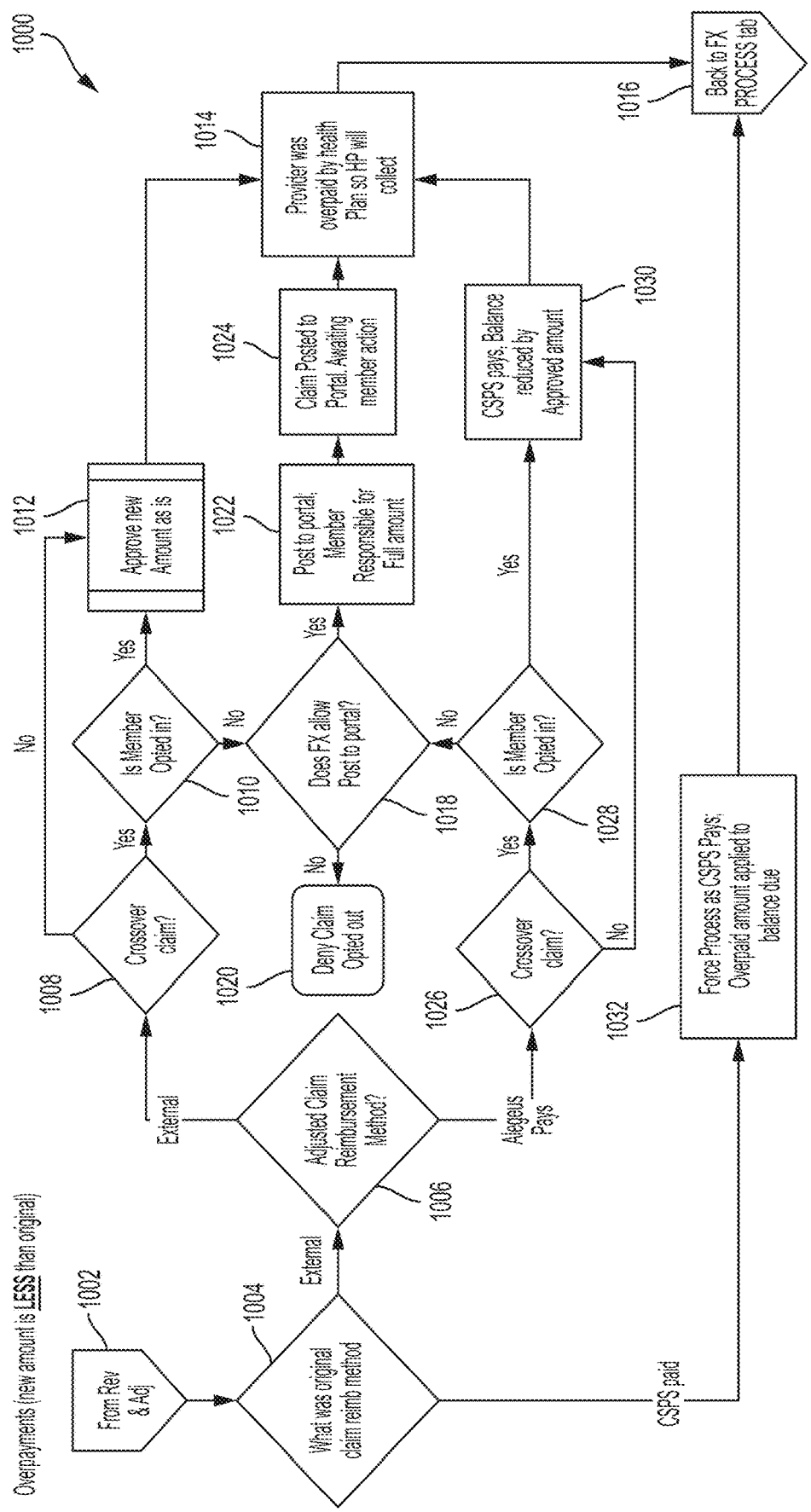
FIG. 10 depicts a flow diagram for managing remote procedure calls and dynamic-state-driven centralized processing, in accordance with some embodiments.

FIG. 10 depicts a flow 1000 for overpayments, where the new amount is less than the original. At 1002, the CSPS receives an indication, input, data structure or data packets from a review and adjudication tab. At 1004, the CSPS 120 determines what the original claim reimbursement method is. If the output of 1004 is external, the CSPS proceeds to 1006 to determine the adjusted claim reimbursement method. If the output of 1006 is also external, then the CSPS 120 proceeds to 1008 to determine whether the claim is a crossover claim. If the CSPS 120 determines the claim is not a crossover claim at 1008 or that the claim is a crossover claim and also determines the member opted in at 1010, then the CSPS 120 proceeds to 1010 an approves the new amount as is.

If the CSPS 120 determines at 1010 the member did no opt in, then the CSPS proceeds to 1018 to determine whether the transaction allow for post to portal. If the output of 1018 is no, then the CSPS 120 proceeds to 1020 and denies the claim as opted out. If the output of 1018 is yes, then the CSPS 120 proceeds to 1022 and posts to portal and indicates the member is responsible for the full amount. The CSPS then proceeds to 1024 and indicates the claim is posted to portal and awaiting member action. The CSPS 120 then proceeds to 1014 to determine the provider was overpaid by the health plan so the health plan collects. The CSPS 120 can then proceed to 1060 and go back to the transaction process tab.

If, at 1006, the CSPS 120 determines that the CSPS is the reimbursement method, the CSPs 120 proceeds to 1026 to determine whether the claim is a crossover claim. If the CSPS 120 determines the claim is a cross over claim, the CSPS 120 proceeds to 1028 and determines whether the member opted in. If the output of 1028 is no, the CSPS 120 proceeds to 1018. If the output of 1028 is yes, then the CSPS 120 proceeds to 1030 and the CSPS pays the balance reduced by the approved amount. If, at 1026, the claim is not crossover, the CSPS also proceeds to 1030. The CSPS 120 then proceeds to 1014.

If, at 1004, the CSPS 120 determines the original claim reimbursement method was CSPS paid, then the CSPS 120 proceeds to 1032 and force the process as CSPS pays, and the overpaid amount is applied to the balance due. The CSPS 120 then proceeds to 1016.

It should be understood that the systems described above can provide multiple ones of any or each of those components and these components can be provided on either a standalone machine or, in some embodiments, on multiple machines in a distributed system. The systems and methods described above can be implemented as a method, apparatus or article of manufacture using programming or engineering techniques to produce software, firmware, hardware, or any combination thereof. In addition, the systems and methods described above can be provided as one or more computer-readable programs embodied on or in one or more articles of manufacture. The term "article of manufacture" as used herein is intended to encompass code or logic accessible from and embedded in one or more computer-readable devices, firmware, programmable logic, memory devices (e.g., EEPROMs, ROMs, PROMs, RAMs, SRAMs, etc.), hardware (e.g., integrated circuit chip, Field Programmable Gate Array (FPGA), Application Specific Integrated Circuit (ASIC), etc.), electronic devices, a computer readable non-volatile storage unit (e.g., CD-ROM, floppy disk, hard disk drive, etc.). The article of manufacture can be accessible from a file server providing access to the computer-readable programs via a network transmission line, wireless transmission media, signals propagating through space, radio waves, infrared signals, etc. The article of manufacture can be a flash memory card or a magnetic tape. The article of manufacture includes hardware logic as well as software or programmable code embedded in a computer readable medium that is executed by a processor. In general, the computer-readable programs can be implemented in any programming language, such as LISP, PERL, C, C++, C#, PROLOG, or in any byte code language such as JAVA. The software programs can be stored on or in one or more articles of manufacture as object code.

References to "or" may be construed as inclusive so that any terms described using "or" may indicate any of a single, more than one, and all of the described terms.

While various embodiments of the methods and systems have been described, these embodiments are exemplary and in no way limit the scope of the described methods or systems. Those having skill in the relevant art can effect changes to form and details of the described methods and systems without departing from the broadest scope of the described methods and systems. Thus, the scope of the methods and systems described herein should not be limited by any of the exemplary embodiments and should be defined in accordance with the accompanying claims and their equivalents.

What is claimed is:

1. A method of dynamic-state-driven centralized processing, comprising:
    receiving, by a centralized state processing system comprising one or more processors and memory, a data structure constructed by a remote transaction processing server based on processing a plurality of electronic transactions that occurred within a spatiotemporal area, the data structure including a plurality of entries that each have a type identifier;
    parsing, by the centralized state processing system, the plurality of entries based on the type identifier to identify a first entry having a first type identifier and a second entry having a second type identifier;
    identifying, by the centralized state processing system, using a parameter repository storing a plurality of thresholds, a first threshold for the first entry based on the first type identifier, and a second threshold for the second entry based on the second type identifier;
    determining, based on a comparison between the first threshold and a first value of the first entry, a positive delta value;
    determining, based on a comparison between the second threshold and a second value of the second entry, a negative delta value;
    selecting, by the centralized state processing system, from a script repository, a first script to apply to the first entry based on the positive delta value and the first type identifier, and a second script to apply to the second entry based on the negative delta value and the second type identifier;
    determining, by the centralized state processing system, a first output for the first entry using the first script, and a second output for the second entry using the second script;
    mapping, by the centralized state processing system, the first output to a first state of a plurality of states of a distributed heterogeneous electronic transaction process;
    mapping, by the centralized state processing system, the second output to a second state of the plurality of states the distributed heterogeneous electronic transaction process;
    determining, by the centralized state processing system, a combined state based on the first state and the second state;
    providing, by the centralized state processing system responsive to a request from a client device received via a computer network, via a hierarchical graphical tree structure, an indication of at least one of the combined state, the first state, or the second state.

2. The method of claim 1, wherein the plurality of states comprises at least two of: partially authorized, partially transacted, applied to portion, reversed, or over-transacted.

3. The method of claim 1, comprising:
    providing, by the centralized state processing system, a modified single data structure with the first output, the second output, the first state, the second state, and the combined state, the modified single data structure replacing one or more of the plurality of entries of the data structure.

4. The method of claim 1, comprising:
performing, by the centralized state processing system, an error check process to validate each of the plurality of entries.

5. The method of claim 1, comprising:
determining, based on an error check process, that an entry of the plurality of entries is at least one of an invalid identifier, missing a field, or a duplicate entry; and
requesting, responsive to the error check process, an updated data structure from the remote transaction processing server.

6. The method of claim 1, wherein determining the first output using the first script comprises:
determining, based on the positive delta value, to apply the first script comprising an under-transaction technique.

7. The method of claim 1, wherein determining the first output using the first script comprises:
determining, based on the positive delta value, to apply the first script comprising an under-transaction technique; and
performing, by the centralized state processing system, based on the under-transaction technique, an electronic transaction corresponding to the positive delta value.

8. The method of claim 1, wherein determining the first output using the first script comprises:
determining, based on the positive delta value, to apply the first script comprising an under-transaction technique, the under-transaction technique comprising:
determining that the centralized state processing system is to perform an electronic transaction corresponding to the positive delta value;
determining that the first type identifier is not a crossover type;
skipping, based on the first type identifier not the crossover type, an opt-in script;
applying an offset; and
conducting, by the centralized state processing system, an electronic transaction based on the offset.

9. The method of claim 1, wherein determining the second output using the second script comprises:
determining, based on the negative delta value, to apply the second script comprising an over-transaction technique; and
performing, by the centralized state processing system, based on the over-transaction technique, an electronic transaction corresponding to the negative delta value.

10. The method of claim 1, wherein determining the second output using the second script comprises:
determining, based on the negative delta value, to apply the second script comprising an over-transaction technique, the over-transaction technique comprising:
determining that an original transaction type was external;
determining than an adjusted transaction type corresponds to the centralized state processing system;
determining that the second type identifier is not a crossover type;
skipping, based on the second type identifier not the crossover type, an opt-in script; and
reducing, by the centralized state processing system, an electronic transaction amount based on the negative delta value.

11. A system for dynamic-state-driven centralized processing, comprising:
a communication interface executed by one or more processors of a centralized state processing system to receive a data structure constructed by a remote transaction processing server based on processing a plurality of electronic transactions that occurred within a spatiotemporal area, the data structure including a plurality of entries that each have a type identifier;
a script selector executed by the centralized state processing system to:
parse the plurality of entries based on the type identifier to identify a first entry having a first type identifier and a second entry having a second type identifier;
identify, using a parameter repository storing a plurality of thresholds, a first threshold for the first entry based on the first type identifier, and a second threshold for the second entry based on the second type identifier;
determine, based on a comparison between the first threshold and a first value of the first entry, a positive delta value;
determine, based on a comparison between the second threshold and a second value of the second entry, a negative delta value;
select, from a script repository, a first script to apply to the first entry based on the positive delta value and the first type identifier, and a second script to apply to the second entry based on the negative delta value and the second type identifier;
a combiner executed by the centralized state processing system to determine a first output for the first entry using the first script, and a second output for the second entry using the second script;
a state manager executed by the centralized state processing system to:
map the first output to a first state of a plurality of states a distributed heterogeneous electronic transaction process;
map the second output to a second state of the plurality of states the distributed heterogeneous electronic transaction process;
determine a combined state based on the first state and the second state; and
provide, responsive to a request from a client device received via a computer network, via a hierarchical graphical tree structure, an indication of at least one of the combined state, the first state, or the second state.

12. The system of claim 11, wherein the plurality of states comprises at least two of: partially authorized, partially transacted, applied to portion, reversed, or over-transacted.

13. The system of claim 11, wherein the centralized state processing system is further configured to:
provide a modified single data structure with the first output, the second output, the first state, the second state, and the combined state, the modified single data structure replacing one or more of the plurality of entries of the data structure.

14. The system of claim 11, wherein the centralized state processing system is further configured to:
perform an error check process to validate each of the plurality of entries.

15. The system of claim 11, wherein the centralized state processing system is further configured to:
determine, based on an error check process, that an entry of the plurality of entries is at least one of an invalid identifier, missing a field, or a duplicate entry; and request, responsive to the error check process, an updated data structure from the remote transaction processing server.

16. The system of claim 11, wherein the centralized state processing system is further configured to:
    determine, based on the positive delta value, to apply the first script comprising an under-transaction technique.

17. The system of claim 11, wherein the centralized state processing system is further configured to:
    determine, based on the positive delta value, to apply the first script comprising an under-transaction technique; and
    perform based on the under-transaction technique, an electronic transaction corresponding to the positive delta value.

18. The system of claim 11, wherein the centralized state processing system is further configured to:
    determine, based on the positive delta value, to apply the first script comprising an under-transaction technique, the under-transaction technique comprising:
        determining that the centralized state processing system is to perform an electronic transaction corresponding to the positive delta value;
        determining that the first type identifier is not a crossover type;
        skipping, based on the first type identifier not the crossover type, an opt-in script;
        applying an offset; and
        conducting, by the centralized state processing system, an electronic transaction based on the offset.

19. The system of claim 11, wherein the centralized state processing system is further configured to:
    determine, based on the negative delta value, to apply the second script comprising an over-transaction technique; and
    perform, based on the over-transaction technique, an electronic transaction corresponding to the negative delta value.

20. The system of claim 11, wherein the centralized state processing system is further configured to:
    determine, based on the negative delta value, to apply the second script comprising an over-transaction technique, the over-transaction technique comprising:
        determining that an original transaction type was external;
        determining than an adjusted transaction type corresponds to the centralized state processing system;
        determining that the second type identifier is not a crossover type;
        skipping, based on the second type identifier not the crossover type, an opt-in script; and
        reducing, by the centralized state processing system, an electronic transaction amount based on the negative delta value.

* * * * *